United States Patent
Smirnov et al.

(10) Patent No.: US 10,041,825 B2
(45) Date of Patent: Aug. 7, 2018

(54) ON-TOOL MASS FLOW CONTROLLER DIAGNOSTIC SYSTEMS AND METHODS

(71) Applicant: Hitachi Metals, Ltd., Minato-ku, Tokyo (JP)

(72) Inventors: Alexei V. Smirnov, Fort Collins, CO (US); Patrick Albright, Wellington, CO (US)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/843,747

(22) Filed: Dec. 15, 2017

(65) Prior Publication Data

US 2018/0106658 A1 Apr. 19, 2018

Related U.S. Application Data

(63) Continuation of application No. 15/459,838, filed on Mar. 15, 2017, now Pat. No. 9,846,073, which is a continuation of application No. 14/321,523, filed on Jul. 1, 2014, now Pat. No. 9,605,992, which is a continuation-in-part of application No. 14/211,804, filed on Mar. 14, 2014, now Pat. No. 9,488,516.

(60) Provisional application No. 61/781,300, filed on Mar. 14, 2013.

(51) Int. Cl.
*G01F 25/00* (2006.01)
*G01F 1/684* (2006.01)
*G05D 7/06* (2006.01)

(52) U.S. Cl.
CPC .......... *G01F 25/0007* (2013.01); *G01F 1/684* (2013.01); *G01F 25/0092* (2013.01); *G05D 7/0635* (2013.01)

(58) Field of Classification Search
CPC .................. G05D 7/0635; G01F 25/0007
See application file for complete search history.

(56) References Cited

U.S. PATENT DOCUMENTS

2011/0247390 A1* 10/2011 Smirnov ............. G01F 25/0053
73/1.16

* cited by examiner

*Primary Examiner* — Paul West
(74) *Attorney, Agent, or Firm* — Neugboren O'Dowd PC

(57) ABSTRACT

Mass flow controllers with on-tool diagnostic capabilities and methods for on-tool diagnostics are disclosed. A mass flow controller includes a differential voltage processing component to provide a first output that is indicative of a differential voltage between second and fourth nodes of a bridge circuit and a top voltage processing component provides a second output indicative of a top voltage between the first node and the third node of the bridge circuit. Top-and-differential voltage reference data stored in non-volatile memory defines a characteristic curve relating top voltage reference values to corresponding differential voltage reference values. A sensor analysis component obtains a top and differential voltage pair and assesses whether the top and differential voltage pair deviates from the characteristic curve to determine whether the sensing element circuit has changed since the top-and-differential voltage reference data was stored in the non-volatile memory.

7 Claims, 25 Drawing Sheets

| i1 | i2 | Settled Output | Delay | Rise Time | Settling Time | Overshoot |
|---|---|---|---|---|---|---|
| + | 0 | | | | | |
| + | + | | | | | |
| + | - | | | | | |
| - | + | | | | | |
| - | - | | | | | |
| - | 0 | | | | | |
| 0 | - | | | | | |
| 0 | + | | | | | |

TOP/DIFFERENTIAL REFERENCE/CALIBRATION DATA

| Flow | Value Indicative of first (Differential) output | Value Indicative of second (top) output | $R_C$ | Amplitude |
|---|---|---|---|---|
| 0 | Dcal(0) | $T_{cal}(0)$ | | |
| $fcal_1$ | $Dcal_1$ | $Tcal_1$ | $(Tcal_1(fcal_1)-Tcal(0))/Dcal_1(fcal_1)$ | $sqrt[(Tcal_1(fcal_1)-Tcal(0))^2 + Dcal_1(fcal_1)^2]$ |
| $fcal_2$ | $Dcal_2$ | $Tcal_2$ | $(Tcal_2(fcal_2)-Tcal(0))/Dcal_2(fcal_2)$ | $sqrt[(Tcal_2(fcal_2)-Tcal(0))^2 + Dcal_2(fcal_2)^2]$ |
| ⋮ | ⋮ | ⋮ | ⋮ | ⋮ |
| $fcal_N$ | $Dcal_N$ | $Tcal_N$ | $(Tcal_N(fcal_N)-Tcal(0))/Dcal_N(fcal_N)$ | $sqrt[(Tcal_N(fcal_N)-Tcal(0))^2 + Dcal_N(fcal_N)^2]$ |

FIG. 25A

OPERATIONAL DATA

| Flow (f) | Differential Voltage | Top Voltage | Ratio ("R") | SF |
|---|---|---|---|---|
| 0 | D(0) | T(0) | | |
| f=fcal/SF | D(f) | T(f) | (T(f)-T(0))/D(f) | Amplitude/ $sqrt[(T(f)-T(0))^2 + D(f)^2]$ |

FIG. 25B

ON-TOOL MASS FLOW CONTROLLER DIAGNOSTIC SYSTEMS AND METHODS

CLAIM OF PRIORITY UNDER 35 U.S.C. § 120

The present Application for Patent is a Continuation of U.S. patent application Ser. No. 15/459,838, filed Mar. 15, 2017, which is a continuation of U.S. patent application Ser. No. 14/321,523, filed Jul. 1, 2014, now U.S. Pat. No. 9,605,992, issued Mar. 28, 2017, which is a continuation-in-part of U.S. patent application Ser. No. 14/211,804, filed Mar. 14, 2014, now U.S. Pat. No. 9,488,516, issued Nov. 8, 2016, which claims priority to U.S. Patent Application No. 61/781,300, filed Mar. 14, 2013, each of which are assigned to the assignee hereof and hereby expressly incorporated by reference.

BACKGROUND

Field

The present invention relates to control systems, and in particular, but not by way of limitation, the present invention relates to systems and methods for managing and maintaining mass flow controllers.

Background

For many manufacturing processes (e.g., thin film deposition processes), it is very important that the mass flow rates of process fluids that are fed into a process chamber be precisely controlled. But many issues arise during ongoing operation of mass flow controllers that adversely affect the ability of mass flow controllers to accurately control mass flow rates.

From the perspective of the user/operator, the particular issues that arise are often not readily apparent or are unexpected, which leads to a high cost of ownership due to unscheduled maintenance. For example, the issues (e.g., minor operating inaccuracies to complete failures) may occur without any immediate indication as to what caused the specific type of undesirable operation. Moreover, users often lack the training, tools, and/or desire to diagnose issues; thus users of mass flow controllers may simply replace mass flow controllers when issues arise. As a consequence, mass flow controllers are often replaced when information about the underlying problem could lead to a simple remedy.

To diagnose issues with a mass flow controller before any major problems occur, the mass flow controller may be removed from the tool (e.g., a plasma processing system) and run through a series of tests under controlled conditions (e.g., at a separate test location). This approach, however, requires the tool to be taken offline, which is a time consuming and potentially very costly approach to diagnosing potential problems with a mass flow controller. Accordingly, a need exists for mass flow controller diagnostic methodologies that are simpler and more cost effective.

SUMMARY

Some aspects of the present invention may be characterized as a mass flow controller including a main flow path for a fluid, a control component, and a control valve to control a flow rate of the fluid. A sensing element circuit is coupled to the control component, and the sensing element circuit includes a bridge circuit including a first, second, third, and fourth nodes, a first resistive component being connected between the first and second nodes, a second resistive component being connected between the second and third nodes, a first sensing element being connected between the first and fourth nodes, and a second sensing element being connected between the fourth and third nodes. The mass flow controller also includes a differential voltage processing component to provide a first output that is indicative of a differential voltage between the second and fourth nodes and a top voltage processing component to provide a second output indicative of a top voltage between the first node and the third node. The mass flow controller also includes top-and-differential voltage reference data stored in non-volatile memory that defines a characteristic curve by relating each of a plurality of top voltage reference values to a corresponding one of a plurality of differential voltage reference values. A sensor analysis component of the mass flow controller is configured to obtain a top and differential voltage pair during operation and assess whether the top and differential voltage pair deviate from the characteristic curve to determine whether the sensing element circuit has changed since the top-and-differential voltage reference data was stored in the non-volatile memory.

Another aspect includes a mass flow controller comprising a main flow path for a fluid and a control component and control valve to control a flow rate of the fluid. A sensing element circuit of the mass flow controller is coupled to the control component, the sensing element circuit including a bridge circuit including a first, second, third, and fourth nodes, a first resistive component being connected between the first and second nodes, a second resistive component being connected between the second and third nodes, a first sensing element being connected between the first and fourth nodes, and a second sensing element being connected between the fourth and third nodes. A differential voltage processing component provides a first output that is indicative of a differential voltage between the second and fourth nodes, and a top voltage processing component provides a second output indicative of a top voltage between the first node and the third node. The mass flow controller includes top-and-differential voltage reference data stored in non-volatile memory that defines a characteristic curve by relating each of a plurality of top voltage reference values to a corresponding one of a plurality of differential voltage reference values for a calibration gas. A sensor analysis component of the mass flow controller is configured to obtain, during substantially no flow through the mass flow controller, the top voltage T(0) from the top voltage processing component. The sensor analysis component also obtains a measured differential voltage D(f) and a measured top voltage T(f) from the differential voltage processing component and the top voltage processing component, respectively, for a process gas at a non-zero flow rate, and the sensors analysis component also obtains an operational ratio, R, wherein $R=(T(f)-T(0))/D(f)$. The sensor analysis component is also configured to identify, in the top-and-differential voltage reference data, a flow value, fcal, that has a same calibration ratio, Rcal, as the operational ratio, wherein $Rcal=(Tcal(fcal)-Tcal(0))/Dcal(fcal)$; calculate a present saturation factor, SF, where $SF=Amplitude/sqrt[(T(f)-T(0))2+D(f)2]$, wherein Amplitude is equal to $sqrt[(Tcal(fcal)-Tcal(0))2+Dcal(fcal)2]$; and compare the present saturation factor, SF, with a reference saturation factor (RSF) to determine whether the differential voltage and top voltage is a valid voltage combination for the process gas.

Yet another aspect of the present invention may be characterized as a mass flow controller that includes a main flow path for a fluid, a control component, and control valve to control a flow rate of the fluid. A sensing element circuit is coupled to the control component, and the sensing element circuit including a bridge circuit including a first, second, third, and fourth nodes, a first resistive component being connected between the first and second nodes, a second resistive component being connected between the second and third nodes, a first sensing element being connected between the first and fourth nodes, and a second sensing element being connected between the fourth and third nodes. A differential voltage processing component provides a first output that is indicative of a differential voltage between the second and fourth nodes, and a top voltage processing component to provide a second output indicative of a top voltage between the first node and the third node. The mass flow controller also includes a top-and-differential voltage reference data stored in non-volatile memory that defines a characteristic curve by relating each of a plurality of top voltage reference values to a corresponding one of a plurality of differential voltage reference values. Sensor analysis means of the mass flow controller includes means for obtaining a top and differential voltage pair during operation and means for assessing whether the top and differential voltage pair deviate from the characteristic curve to determine whether the sensing element circuit has changed since the top-and-differential voltage reference data was stored in the non-volatile memory.

BRIEF DESCRIPTION OF THE DRAWINGS

FIG. 18 is a table depicting exemplary fields for reference data content;

FIG. 25A is a table that includes exemplary top/differential voltage reference data;

FIG. 25B is a table that includes exemplary operational data associated with the mass flow controller described with reference to FIG. 20.

DETAILED DESCRIPTION

Figure 1:
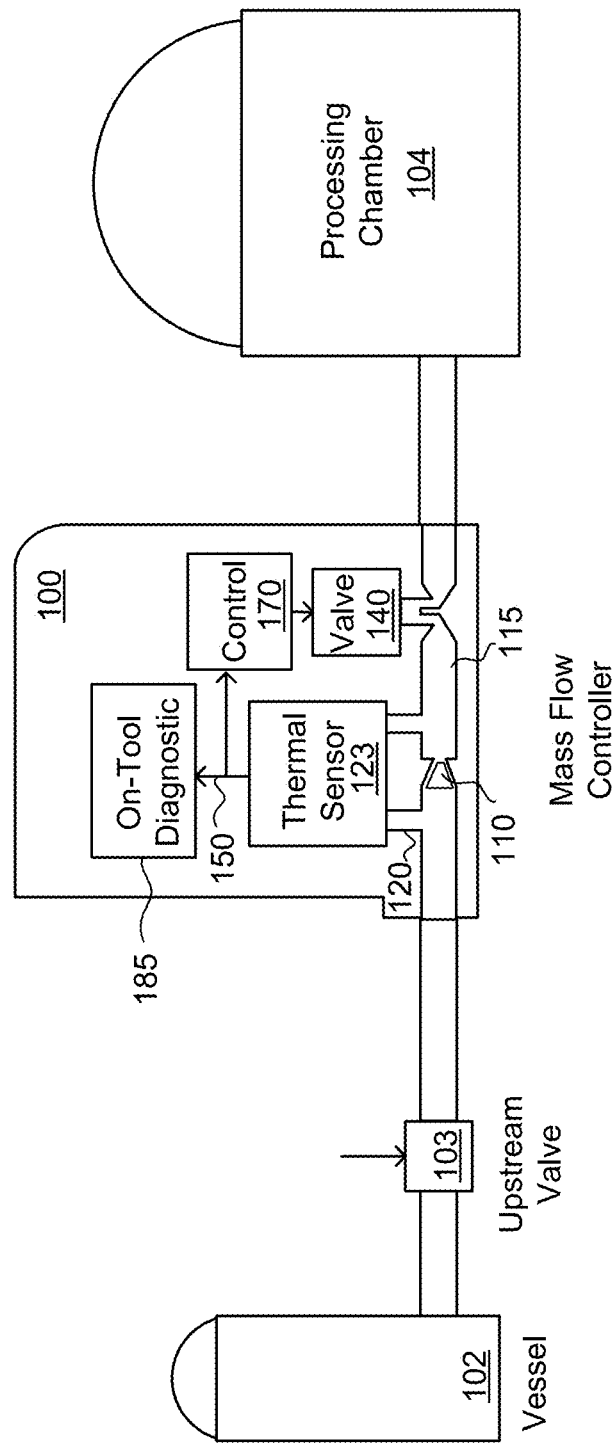
FIG. 1 is a diagram depicting an exemplary mass flow controller coupled to a plasma processing tool.

Several embodiments disclosed herein enable mass flow controllers to be assessed, on-tool (that is, while coupled to the tool), to diagnose potential issues that may lead to inaccuracies or failures of mass flow controllers. Referring to FIG. 1 for example, shown is a mass flow controller ("MFC") 100 that is coupled to a plasma-processing tool (e.g., between a fluid containment vessel 102 and a processing chamber 104). Although not required in many embodiments, an upstream valve 103 is depicted in FIG. 1. As described in more detail herein, embodiments enable operation of the mass flow controller 100 to be evaluated (e.g., between processing runs) while the mass flow controller 100 is coupled to the processing tool to avoid expensive down time and labor expense. The evaluation described herein may include a variety of different types of performance or operational diagnostics.

As shown, the MFC 100 includes a bypass 110 through which a fluid (e.g., gas or liquid) flows, and when operating properly, the bypass 110 directs a constant proportion of fluid through a main path 115 and a sensor tube 120. As a consequence, the flow rate of the fluid through the sensor tube 120 is indicative of the flow rate of the fluid flowing through the main path 115 of the MFC 100. In some instances, however, undesirable conditions (e.g., contamination in the main flow line) may cause a disproportionate level of fluid to flow through the sensor tube 120, which leads to inaccurate flow readings. As discussed further herein, some embodiments of an on-tool diagnostic portion 185 enable any disproportionate level of flow through the sensor tube 120 to be detected (while the MFC 100 is coupled to the tool) so that the user/operator of the MFC 100 is aware of the issue and can address any problems appropriately.

As depicted, a thermal mass flow sensor 123 provides a flow sensor signal 150 that is indicative of the flow rate through the sensor tube 120, and hence, indicative of the flow rate through the main path 115 of the MFC 100. The flow sensor signal 150 is utilized by a control component 170 to control the mass flow rate of the fluid through the MFC with a control valve 140. And in addition, some variations of the on-tool diagnostic portion 185 implement on-tool methodologies for assessing whether there are potential problems with the thermal mass flow sensor 123. For example, the on-tool diagnostic portion 185 may implement one or more methodologies to assess sensitivity of the thermal mass flow sensor 123 and may provide an indication of contamination in the sensor tube 120.

In several embodiments, the fluid controlled by the MFC 100 is a gas (e.g., nitrogen), but a person skilled in the art will appreciate, having the benefit of this disclosure, that the fluid being delivered by the MFC 100 may be any kind of fluid including, for example, a mixture of elements and/or compounds in any phase, such as a gas or a liquid. Depending upon the application, the MFC 100 may deliver a fluid in a gaseous state (e.g., nitrogen) and/or a liquid state (e.g., hydrochloric acid) to, for example, the tool in a semiconductor facility. The MFC 100 in many embodiments is configured to deliver a fluid under high pressure, low temperature, or to different types of containers or vessels.

Figure 2:
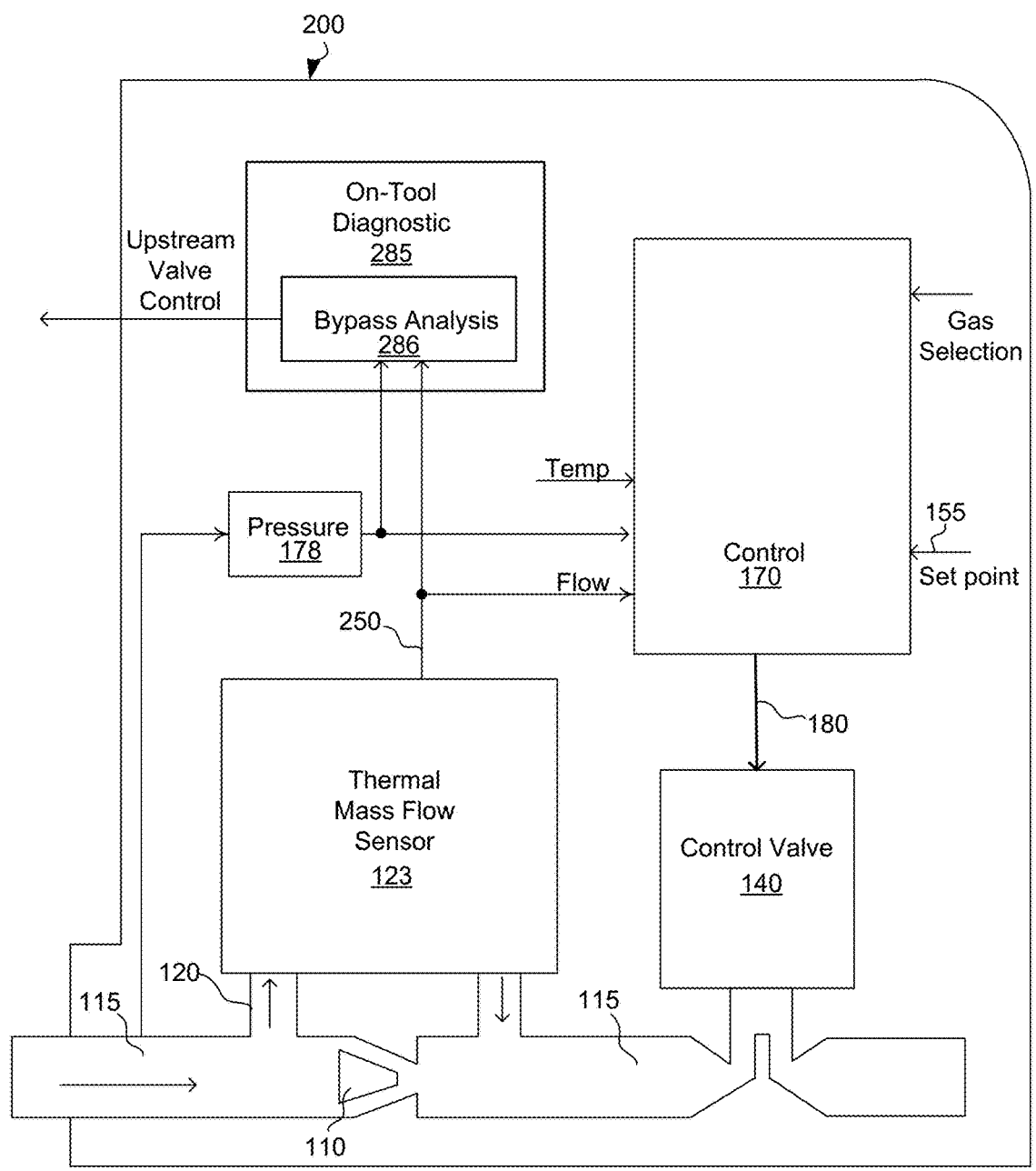
FIG. 2 is a diagram depicting one embodiment of the mass flow controller illustrated in FIG. 1.

Referring next to FIG. 2, shown is an MFC 200 that includes an on-tool diagnostic portion 285 that includes a bypass analysis component 286 to diagnose whether the amount of total flow that is diverted through the sensor tube 120 is the amount that is expected so that the thermal mass flow sensor 123 provides an accurate indication of the flow level through the main path 115.

As discussed above, the thermal mass flow sensor 123 provides a flow sensor signal 250 that is indicative of a mass flow rate of a fluid through the main path 115 of the MFC 200. As one of ordinary skill in the art will appreciate, the thermal mass flow sensor 123 may include sensing elements (not shown) that are coupled to (e.g., wound around) the outside of sensor tube 120. In one illustrative embodiment, the sensing elements are resistance-thermometer elements (e.g., coils of conductive wire), but other types of sensors (e.g., resistance temperature detectors (RTD and thermocouples)) may also be utilized in the embodiment depicted in FIG. 2. Moreover, other embodiments may certainly utilize different numbers of sensors and different architectures for processing the signals from the sensors without departing from the scope of the present invention.

One of ordinary skill in the art will also appreciate that the thermal mass flow sensor 123 may also include a sensing-element circuit (e.g., a bridge circuit) that provides a flow sensor signal 250 as an output, which is indicative of the flow rate through the sensor tube 120, and hence, indicative of the flow rate through the main path 115 of the MFC 100. And the flow sensor signal 250 may be processed so that it is a digital representation of the mass flow rate of a fluid through the main flow path 115 of the MFC 100. For example, the thermal mass flow sensor 123 may include amplification and analog to digital conversion components to generate the flow sensor signal 250.

In alternative embodiments, the thermal mass flow sensor 123 may be realized by a laminar flow sensor, coriolis flow sensor, ultrasonic flow sensor or differential pressure sensor. Pressure measurements may be provided by a gage pressure sensor, differential sensor, absolute pressure sensor or piezoresistive pressure sensor. In variations, the thermal mass flow sensor 123 and/or pressure measurements are used in combination with any combination of other sensors (e.g., temperature sensors) to accurately measure the flow of the fluid.

The control component 170 in this embodiment is generally configured to generate a control signal 180 to control a position of the control valve 140 based upon a set point signal 155. The control valve 140 may be realized by a piezo valve or solenoid valve, and the control signal 180 may be a voltage (in the case of a piezo valve) or current (in the case of a solenoid valve). And as one of ordinary skill in the art will appreciate, the MFC 200 may include a pressure sensor 178 and a temperature sensor (not shown) that provide respective pressure and temperature inputs to the control component 170. For example, the pressure sensor 178 may be placed to sense pressure in the main path 115 upstream of the sensor tube 120 (as depicted in FIG. 2) or downstream of the bypass 110.

In this embodiment, the bypass analysis component 286 generally operates to assess whether an expected proportion of fluid is flowing through the sensor tube 120 relative to the main path 115. As discussed above, the ratio of mass flow through the sensor tube 120 to the mass flow through the main path 115 must be known; otherwise measurements of the mass flow through the sensor tube 120 will not provide an accurate indication of the mass flow through the main path 115. It is known, however, that when the mass flow rate of the fluid is relatively high, the flow characteristics of the fluid change from laminar flow to turbulent flow; thus, a higher proportion of fluid may flow through the sensor tube 120, which provides an inaccurate indication of the mass flow rate through the main path 115.

Figure 3:
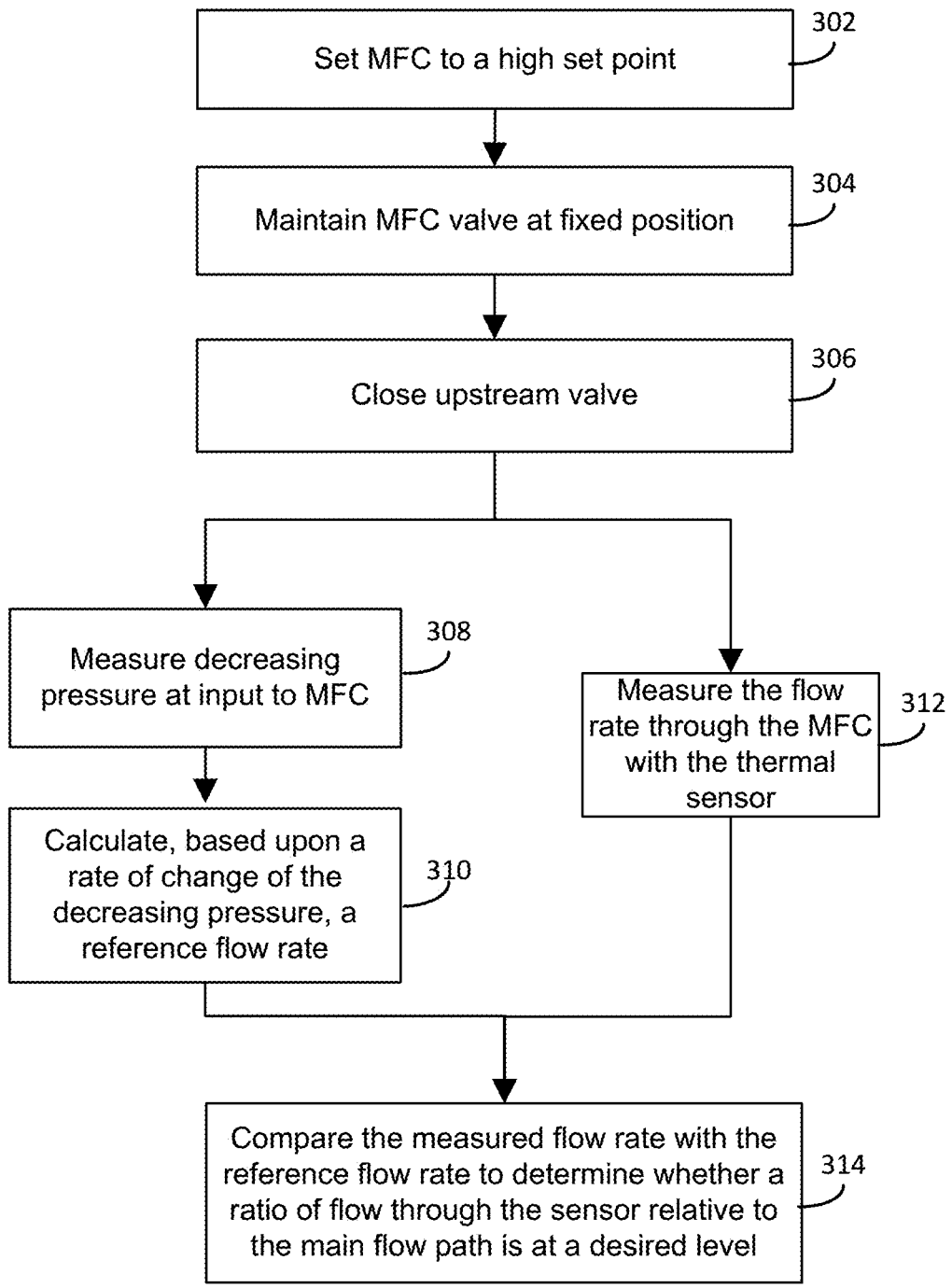
FIG. 3 is a flowchart illustrating a method that may be traversed by the mass flow controller depicted in FIG. 2.
Figure 4A:
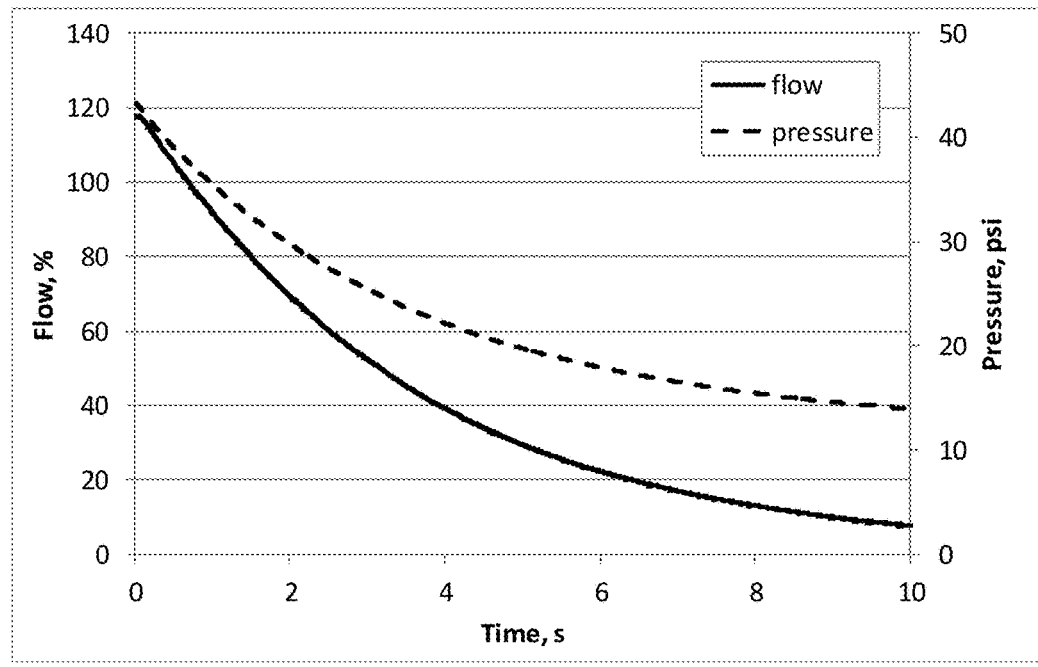
FIG. 4A is a graph depicting an exemplary flow rate and pressure of a fluid.

While referring to FIG. 2 simultaneous reference is made to FIG. 3, which is a flowchart depicting an exemplary method for assessing whether the ratio of sensor tube flow to main path flow has departed from a desired value. As depicted, the set point signal 155 of the MFC 200 may be set to a high level (e.g., 100% of full flow)(Block 302), and then the position of the control valve 140 that provides the high level of flow is maintained (Block 304). The upstream valve 103 (upstream from the sensor tube 120) is then closed (Block 306), and a level of decreasing fluid pressure is then measured (e.g., by the pressure sensor 178)(Block 308). Referring briefly to FIG. 4A, it depicts measured flow ("flow") and fluid pressure versus time for an exemplary mass flow controller where the upstream valve 103 was closed at time t=0.

As shown in FIG. 3, based upon this decreasing pressure measurement (Block 308), a reference flow rate is calculated based upon a rate of change of the decreasing pressure (Block 310). The reference flow rate is generally a calculation of flow through the MFC 200 that is based upon pressure readings from the pressure sensor 178, and in many embodiments, the reference flow rate may simply be calculated as an absolute value of a rate of change (dp/dt) of the decreasing pressure. In some embodiments, as depicted in FIGS. 1 and 2, the upstream valve 103 is external to the MFC, and the upstream valve 103 may be closed by a signal from the MFC 200 or may be closed by a signal from a separate processing tool. In other embodiments the upstream valve 103 is integrated into the MFC 200 and positioned upstream from the sensor tube 120.

Figure 4B:
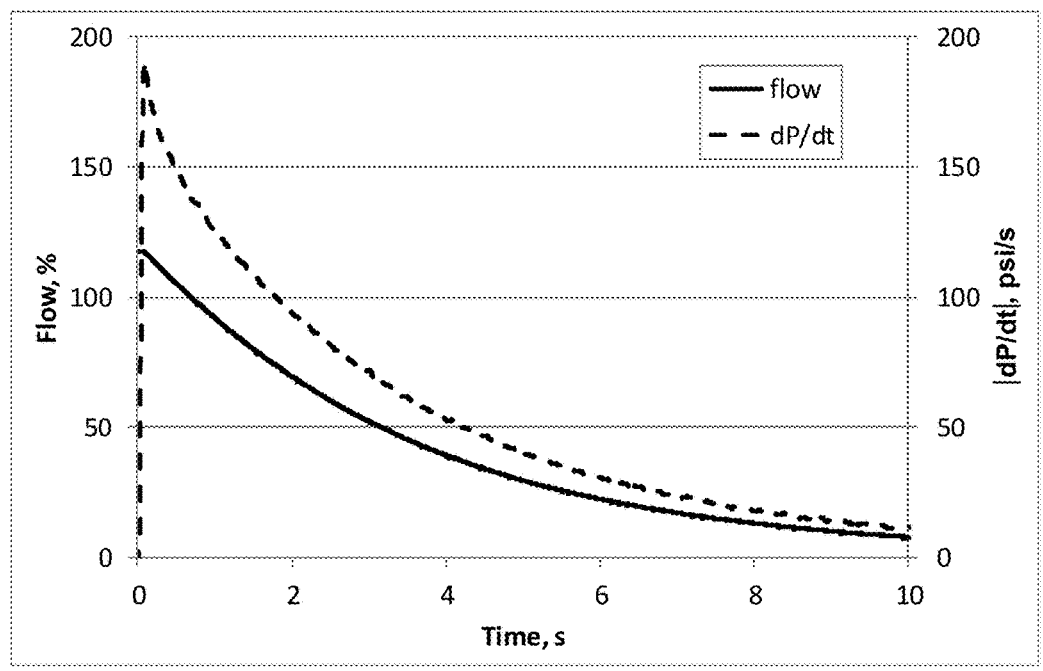
FIG. 4B is a graph depicting the flow rate and a rate of change of the pressure depicted in FIG. 4A.

As shown, in parallel with the measurement of the decreasing pressure (Block 308) and the calculation of the reference flow rate (Block 310) the thermal mass flow sensor 123 of the MFC 200 is used to measure a flow rate of the fluid through the MFC 200 to obtain a measured flow rate (Block 312). FIG. 4B depicts measured flow ("flow") and a reference flow rate that is calculated by taking the absolute value of a derivative of pressure as a function of time. The measured flow rate is then compared to the reference flow rate (calculated using the pressure measurements) to determine whether the flow through the sensor tube 120 is linearly proportional to the flow around the bypass 110 (Block 314). For example, based upon the ideal gas law, a rate of change of the pressure dp/dt is generally proportional to (dn/dt)(R)(T) where n is a number of molecules of the gas measured in moles that exist between the upstream valve 103 and the thermal mass flow sensor 123, T is the absolute temperature of the gas and R is the ideal, or universal, gas constant; thus the absolute value of dp/dt is proportional to the flow rate of the fluid through the MFC 200. As a consequence, the ratio of the absolute value of dp/dt to the flow rate measured by the sensor 123 is constant if the flow through the sensor tube 120 is linearly proportional to the flow around the bypass 110. In other words, if the ratio of the absolute value of dp/dt to the flow rate measured by the sensor 123 is constant, it may be assumed that the proper mass flow rate is being diverted through the sensor tube.

Figure 4C:
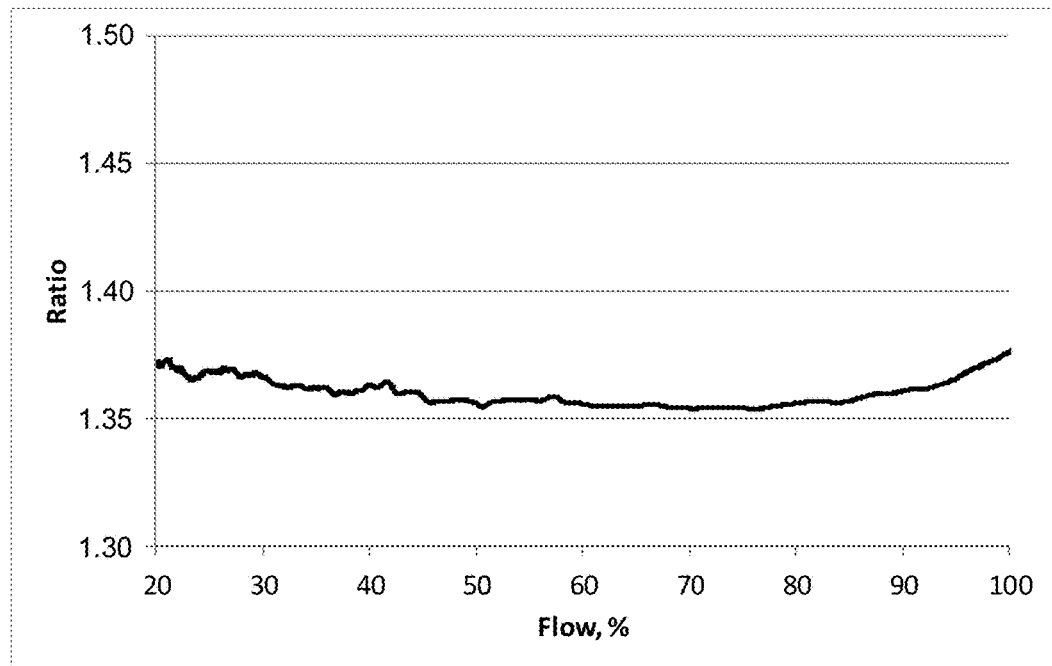
FIG. 4C is a graph depicting an exemplary baseline ratio curve that relates the rate of change of the pressure depicted in FIG. 4B to the flow rate depicted in FIGS. 4A and 4B.

The steps described above with reference to Blocks 302-310 may be carried out when the MFC 200 is known to be operating properly (e.g., any contamination within the MFC 200 is within acceptable levels) to obtain a baseline-ratio curve as a reference. The data for the baseline-ratio curve may be stored in a memory of the MFC 200 and may be utilized to determine whether the bypass 110 may be contaminated. For example, a manufacture and/or operator of the MFC 200 may carry out the steps associated with Blocks 302-310 just before initiating a process run (e.g., thin-film deposition) with the MFC 200. Referring to FIG. 4C, for example, it shows a graph depicting an exemplary baseline-ratio of the absolute value of dp/dt to the measured flow that may be used as a reference. Although there is some variation in the ratio of dp/dt to the measured flow (as measured by the thermal mass flow sensor 123), the collection of data in FIG. 4C that makes up the baseline-ratio curve may be used as a baseline by which the comparison of Block 314 may be carried out.

It should be noted that the flow rate through the MFC 200 is proportional to the absolute value of dp/dt and the volume between the upstream valve 103 and the thermal mass flow sensor 123, and the flow rate is inversely proportional to temperature. Nonetheless, neither the volume (between the upstream valve 103 and the thermal mass flow sensor 123) nor the temperature needs to be known. More specifically, information about the volume is unnecessary because only the "non-linearity" of the flow through the sensor tube 120 relative to the flow around the bypass 110 is estimated, and the comparison at Block 314 reveals whether the non-linearity is changing over time or not. Any indication of non-linearity may be obtained by monitoring the ratio of the absolute value of dp/dt to the measured flow rate. Ideally the ratio is a constant value, but the real ratio may be different.

A "measure" of contamination may be how much a shape of a new, test-ratio curve is different from the shape of the baseline-ratio (depicted in FIG. 4C) that is obtained during manufacturing or during initial operation of the MFC on the tool. Temperature does not need to be measured because the flow measurement may be performed very quickly (e.g., over only a few seconds) so that the temperature does not change during each measurement interval.

Comparison of the shape of a test-ratio curve obtained during operation to the baseline-ratio may be performed by comparing a baseline characterization value (that characterizes one of the baseline-ratio curves) and a test characterization value (that characterizes a test-ratio curve). One approach to calculating a characterization value (curve_value) is as follows: curve_value=(max_value−min_value)/(average_value) where max_value is a maximum value of a curve, min_value is a minimum value of the curve, and the average_value is an average value of the curve. When each of the baseline-ratio curve and the test-ratio curve are characterized as a single value, the corresponding value may simply be compared to determine whether a change has occurred in the MFC 200 that is indicative of contamination. If this simple comparison (of characterization values) suggests there may be contamination within the MFC 200, then a detailed analysis of the curve data may be performed to help determine the particular location of the contamination. An alternate approach to calculating a characterization value may be performed as follows: curve_value=((ratio_100%+ratio_20%)/(ratio_60%)) where ratio_100% is a value of the ratio curve at 100% flow; ratio_20% is a value of the ratio curve at 20% flow; and ratio_60% is a value of the curve at 60% of flow.

Figure 4D:
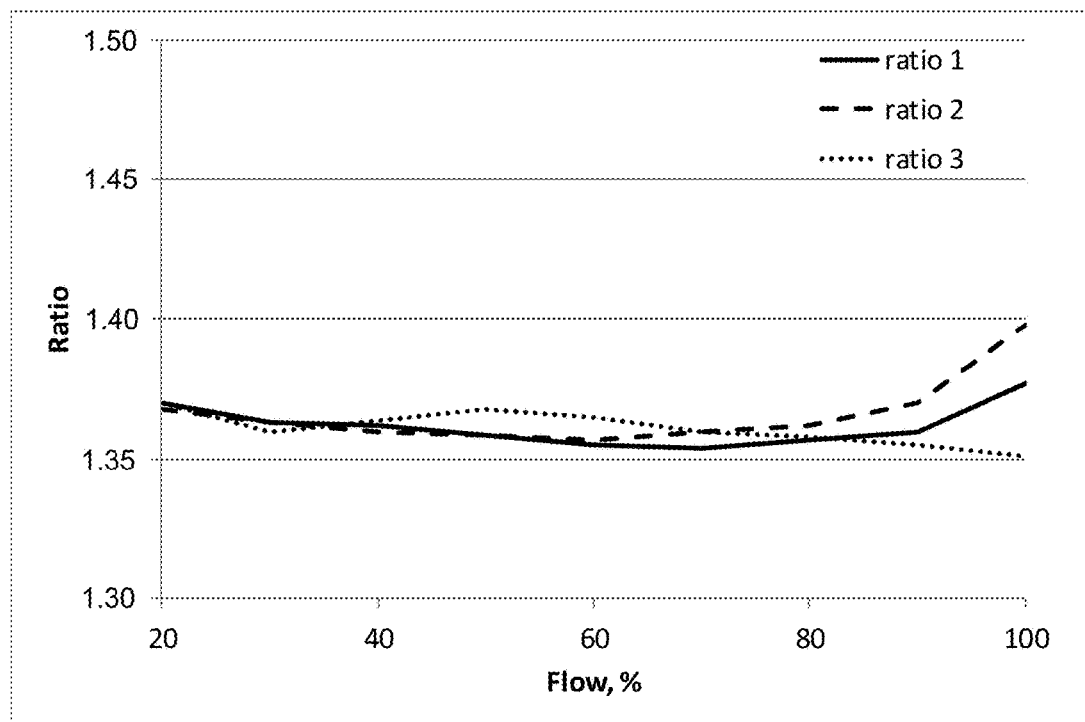
FIG. 4D is a graph depicting the baseline ratio curve illustrated in FIG. 4C along with exemplary test ratio curves.

Referring to FIG. 4D, it depicts three ratio curves: a baseline-ratio curve (ratio 1); a first-test-ratio curve (ratio 2); and a second-test-ratio curve (ratio 3). As shown, values of first-test-ratio curve are greater than values of the baseline-ratio curve at flow rates above 90%, which is indicative of contamination within the bypass 110 of the MFC 200. In contrast, values of second-test-ratio curve are lower than values of the baseline-ratio curve at flow rates above 90%, which is indicative of contamination within the thermal mass flow sensor 123 of the MFC 200.

Figure 5:
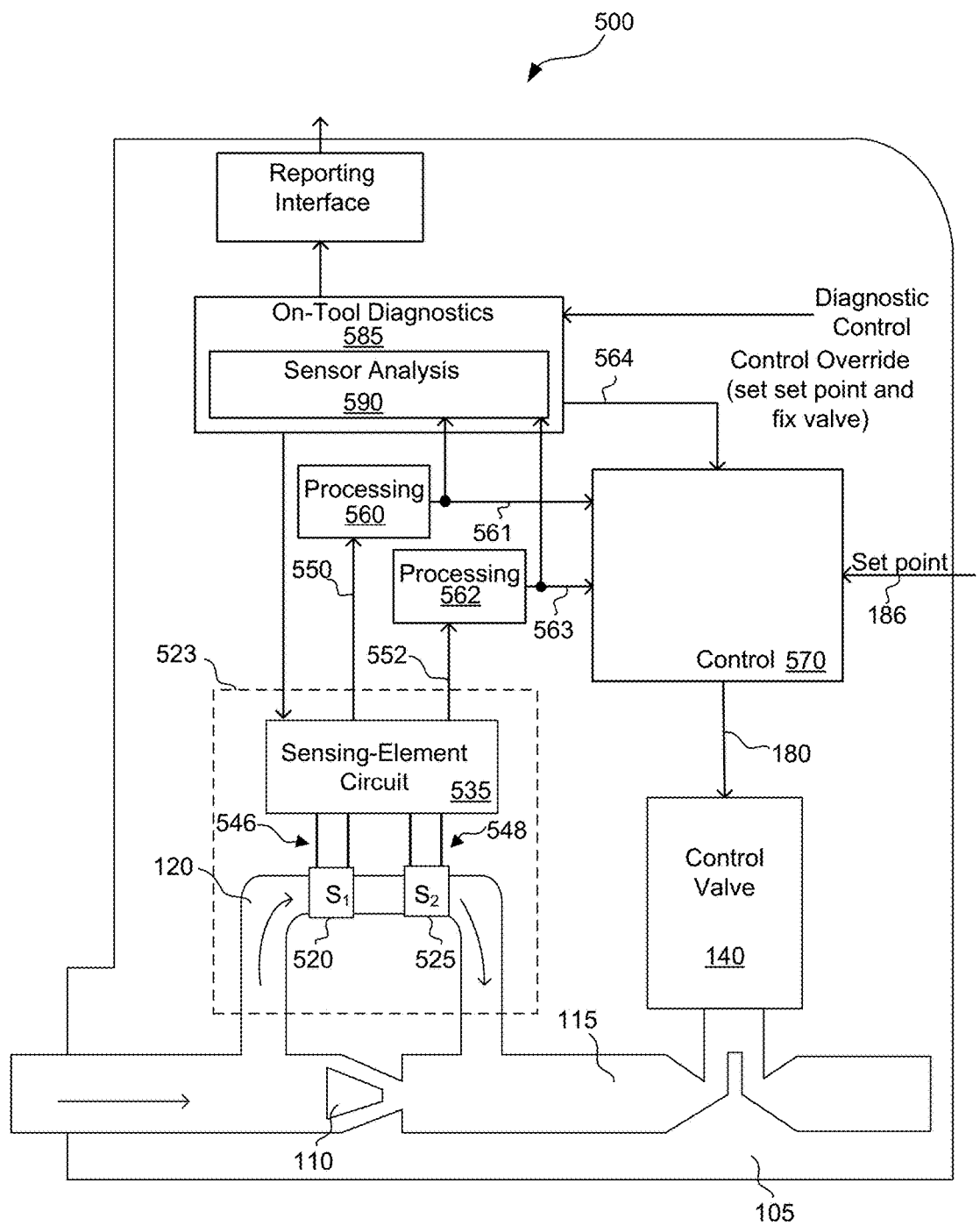
FIG. 5 is a diagram depicting another embodiment of the mass flow controller illustrated in FIG. 1.

Referring next to FIG. 5, it depicts an exemplary mass flow controller (MFC) 500 that includes a sensor analysis component 590 in an on-tool diagnostic portion 585. As depicted, in the present embodiment heating-sensing elements 520, 525 are coupled to the outside of sensor tube 120. In one illustrative embodiment, heating-sensing elements 520, 525 are coils of conductive wire that are wound around the sensor tube 120.

As depicted, heating-sensing elements 520, 525 are included within a thermal mass flow sensor 523 and are electrically connected to a sensing-element circuit 535. In this particular embodiment, the sensing-element circuit 535 is configured (responsive to signals 546, 548 from the heating-sensing elements 520, 525) to provide two flow sensor signals 550, 552 (also referred to herein as outputs 520, 525). Each of these flow sensor signals 550, 552 separately (and/or together) is indicative of the flow rate through the sensor tube 120, and hence, indicative of the flow rate through the main path 115 of the MFC 500. The sensor analysis component 590 employs on-tool methodologies to diagnose whether there are potential problems with the sensor tube 120 (e.g., contamination) and whether there may be any deficiency with the sensitivity of the thermal mass flow sensor 523. Some of the diagnostic methodologies disclosed herein utilize both of the two flow sensor signals 550, 552, but others operate without requiring use of both of the flow sensor signals 550, 552.

As shown in FIG. 5, the flow sensor signals 550, 552 may be processed by processing components 560, 562 to generate measured flow signals 561, 563 corresponding to the first and second flow sensor signals 550, 552. For example, the measured flow signals 561, 563 may be respective digital representations of the flow sensor signals 550, 552. More specifically, the processing components 560, 562 depicted with reference to FIG. 5, and the processing components 660, 662, 760, 762, 860, 962, 1160, 1162 described further herein, may amplify and convert, using an analog to digital converter, the flow sensor signals 550, 552 to digital representations of the flow sensor signals 550, 552.

As one of ordinary skill in the art will readily recognize, the processing components 560, 562, 660, 662, 760, 762, 860, 962, 1160, 1162 may also adjust each of the flow sensor signals 550, 552 (e.g., by adjusting each of the signals by predetermined calibration coefficients) based upon physical characteristics of the MFC 500 and/or characteristics of the fluid (e.g., gas) flowing through the MFC 500.

The control component 570 in this embodiment is generally configured to control a position of the control valve 140 based upon one, or both, of the measured flow signals 561, 563. In some embodiments the control component 570 may utilize both measured flow signals 561, 563 simultaneously to control flow of the mass flow controller 500.

The sensing-element circuit 535 may be realized by a variety of circuit architectures, but FIGS. 6-11 depict exemplary sensing-element circuits 635, 735, 835, 935, 1135 and corresponding sensor analysis components 690, 790, 890, 990, 1090, 1190 that may reside within an MFC (e.g., MFC 500). In each of the embodiments depicted in FIGS. 6-11 the sensor analysis component 590 includes a diagnostic analysis component 692, 792, 892, 992, 1092, 1192; a diagnostic signal generator 694, 794, 894, 1094, 1194; and reference data 695, 795, 895, 995, 1095, 1195.

In general, the sensor analysis component 690, 790, 890, 990, 1090, 1190 utilizes thermal sensor diagnostic techniques to detect whether operation of the thermal mass flow sensor 523 has changed over time. The operation of the thermal mass flow sensor 523 may change over time due to a variety of different reasons. For example, contamination in the center of the sensor tube 120 and/or close to the heating sensing elements 520, 525 may be detected, and in addition, changes in the sensor insulation and the sensor housing may also be detected. It is also possible that changes outside of the sensor housing may also affect the operation of the thermal mass flow sensor 523. As described further herein, tests associated with the embodiments depicted in FIGS. 5-11 may be performed with a gas inside the tube 120, or without the gas in the tube (e.g., a vacuum in the sensor tube 120).

The diagnostic signal generator 694, 794, 894, 1094, 1194 generally functions to emulate the effects that a change in gas flow has upon the heating-sensing elements 520, 525. More specifically, the diagnostic signal generator 694, 794, 894, 1094, 1194 effectuates a modification to the heating of one or more of the heating-sensing elements 520, 525, and this heating modification facilitates a determination as to whether operation of the thermal mass flow sensor 523 changed over time. The diagnostic signal generator 694, 794, 894, 1094, 1194 may be realized by a variety of different architectures and components to provide a controllable means for modifying the heating of the heating-sensing elements. For example, controllable current sources 670, 680, 770, 780, 870, 880 may be utilized as described with reference to FIGS. 6-9; controllable switches 1070, 1080 may be utilized as described with reference to FIG. 10; and controllable voltage sources 1170, 1180 may be utilized as described with reference to FIG. 11.

The diagnostic analysis component 692, 792, 892, 992, 1092, 1192 operates to control the diagnostic signal generator 694, 794, 894, 1094, 1194 and analyze values of one or more outputs of the thermal mass flow sensor 523 (that are output in response to a particular modification to the heating of one or more of the heating sensing elements 520, 525) relative to previously obtained reference data 695, 795, 895, 995, 1095, 1195 that characterizes a prior operation of the thermal mass flow sensor 523 in response to the same particular modification to the heating of the one or more heating-sensing elements 520, 525. The analysis of the present operation versus the prior operation enables a determination as to whether operation of the mass flow sensor has changed over time.

The diagnostic analysis component 692, 792, 892, 992, 1092, 1192 may be realized by a variety of different types of hardware or hardware in combination with a non-transitory, tangible processor readable storage medium that is encoded with processor executable instructions to effectuate the methodologies disclosed herein. One of ordinary skill in the art will appreciate, in view of this specification, that the hardware may include hardware specifically designed to control the diagnostic signal generator 694, 794, 894, 1094, 1194 and analyze one or more outputs of the thermal mass flow sensor 523 in connection with the reference data 695, 795, 895, 995, 1095, 1195. Some examples of specifically designed hardware include an application specific integrated circuit (ASIC); a field programmable gate array (FPGA) or other programmable logic device; discrete gate or transistor logic; discrete hardware components, or any combination thereof designed to perform the functions of the diagnostic analysis component 692, 792, 892, 992, 1092, 1192 described herein.

In addition, the diagnostic analysis component 692, 792, 892, 992, 1092, 1192 may be realized by one or more processors, such as a general-purpose processor or digital signal processor (DSP), that operate to execute processor executable instructions that reside in a non-transitory, tangible processor readable storage medium (e.g., non-volatile memory). A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The content of the reference data 695, 795, 895, 995, 1095, 1195 may vary depending upon the particular implementation of the sensing-element circuit 535, but in general, the reference data 695, 795, 895, 995, 1095, 1195 characterizes the prior operation of the thermal mass flow sensor 523 in response to the particular modification to the heating of the one or more heating-sensing elements 520, 525. Referring briefly to FIG. 18 for example, shown is a table that may be populated with a collection of exemplary reference data 1895 that includes values for parameters that characterize one or more outputs of the thermal mass flow sensor 523 relative to a particular combination of changes to electrical current through the heating-sensing elements 520, 525 that occurs in connection with the modification to the heating of the heating sensing elements. The changes to electrical current i1 and i2 are depicted as an addition symbol "+," to depict an increase in current; a minus symbol "−" to depict a decrease in current; and a zero "0" to depict no change in the current. The parameter values may include values for parameters including a settled output, delay, rise time, settling time, and overshoot.

The reference data 695, 795, 895, 995, 1095, 1195 may reside in locally on board the mass flow controller 100 within a reference data storage component that may be realized by a variety of different types of non-transitory tangible storage mediums such as non-volatile memory. The reference data 695, 795, 895, 995, 1095, 1195 may also be received from a remote storage location (e.g., via network connections well known to those of ordinary skill in the art). As discussed further herein, the reference data 695, 795, 895, 995, 1095, 1195 may be generated during manufacture of the mass flow controller 100 before the mass flow controller 100 is provided to an end user, and/or the reference data 695, 795, 895, 995, 1095, 1195 may be generated on-tool. In either case, the reference data 695, 795, 895, 995, 1095, 1195 characterizes operation of the thermal mass flow sensor 523 prior to one or more diagnostic methods disclosed further herein.

Figure 6:
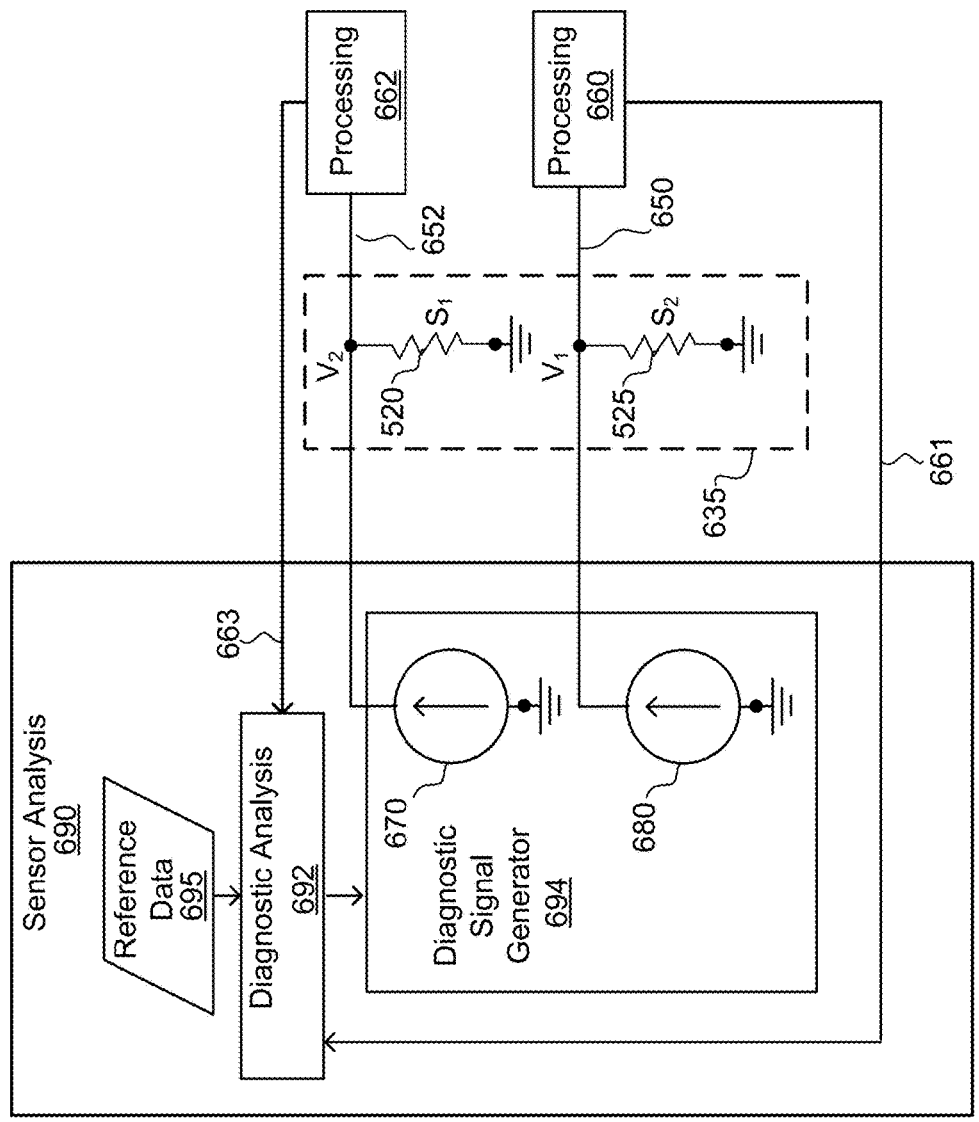
FIG. 6 is a diagram depicting an exemplary portion of the mass flow controller described with reference to FIG. 5.

Referring to the embodiment depicted in FIG. 6, the sensing-element circuit 635 in this embodiment includes the heating-sensing elements 520, 525, which are each coupled to ground and a corresponding one of two controllable current sources 670, 680 within the diagnostic signal generator 694. Also shown as part of the sensor analysis component 690 is the diagnostic analysis component 692 that is coupled to both the diagnostic signal generator 694 and reference data 695.

Under a typical mode of operation, e.g., when the mass flow controller 500 is operating to provide a gas or liquid to a plasma processing chamber, each of the controllable current sources 670, 680 applies the same level of constant current to a corresponding one of the heating-sensing elements 520, 525, and the depicted processing components 660, 662 sample the voltages V1 and V2 to obtain measurements of the voltages V1 and V2. The heating-sensing elements 520, 525 in this embodiment have a resistance that is substantially the same, and as a consequence, a voltage difference V2−V1 is proportional to gas flow.

When operated in a diagnostic mode of operation, the current provided by one or both of the controllable current sources 670, 680 is changed to effectuate a particular modification to the heating of the heating-sensing elements 520, 525, and the voltages V1, V2 are measured and processed by the processing components 660, 662 to provide corresponding measured flow signals 661, 663 to the diagnostic analysis component 692. The diagnostic analysis component 692 then utilizes the measured flow signals 661, 663 to analyze the present operation of the thermal mass flow sensor 523 in response to the particular modification to the heating of the heating-sensing elements 520, 525 relative to a prior operation of the thermal mass flow sensor 523 (that previously occurred in response to the particular modification to the heating) to assess whether operation of the thermal mass flow sensor 523 has changed over time.

The prior operation of the thermal mass flow sensor 523 (in response to the particular modification to heating) is characterized by the reference data 695, and as discussed further herein, one or more parameter values may be compared by the diagnostic analysis component 692 to determine whether the operation of the mass flow controller 523 changed over time.

Figure 7:
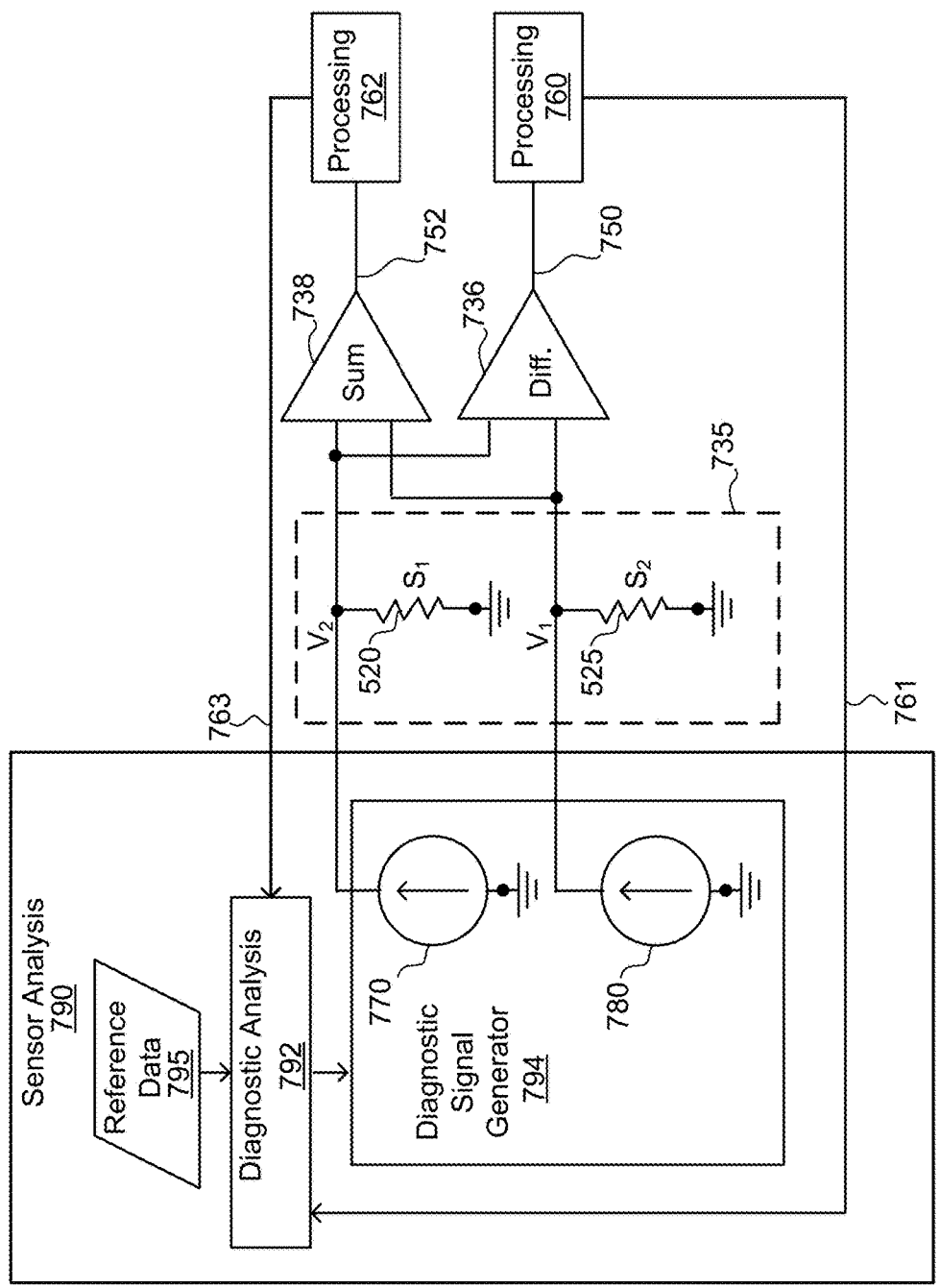
FIG. 7 is a diagram depicting another exemplary portion of the mass flow controller described with reference to FIG. 5.

Referring next to FIG. 7, the sensing-element circuit 735 in this embodiment includes the heating-sensing elements 520, 525, which are each coupled to ground and a corresponding one of two controllable current sources 770, 780 within the diagnostic signal generator 794 that is a part of a sensor analysis component 790. Also shown as part of the sensor analysis component 790 are the diagnostic analysis component 792 that is coupled to both the diagnostic signal generator 794 and reference data 795. In this embodiment, a summing amplifier 738 averages the voltages V1 and V2, and a differential operating amplifier 736 obtains a difference between V1 and V2.

Under a typical mode of operation, e.g., when the mass flow controller 500 is operating to provide a gas or liquid to a plasma processing chamber, each of the controllable current sources 770, 780 applies the same level of constant current to a corresponding one of the heating-sensing elements 520, 525, and the depicted processing components 760, 762 sample the flow sensor signals 750, 752 that are output, respectively, from the differential operating amplifier 736 and the summing amplifier 738, and provide corresponding measured flow signals 761, 763. The flow sensor signal 750 that is output by the differential operating amplifier 736 is generally proportional to the mass flow rate of the fluid flowing through the thermal mass flow sensor 523, but it is only linearly proportional to the mass flow rate over a portion of the full operating range of the thermal mass flow sensor 523; thus the processing component 760 may adjust for the non-linearity of the flow sensor signal 750 so that the measured flow signal 761 is linearly proportional to the mass flow rate. The flow sensor signal 752 that is output from the summing amplifier 738 generally decreases in a non-linear relation to the mass flow rate, and as a consequence, the processing component 762 may be configured to generate a measured flow signal 763 that generally varies in a linear relation to the mass flow rate.

When operated in a diagnostic mode of operation, the current provided by one or both of the controllable current sources 770, 780 is changed to effectuate a particular modification to the heating of the heating-sensing elements 520, 525. The diagnostic analysis component 792 then analyzes, based upon the measured flow signals 761, 763, the present operation of the thermal mass flow sensor 523 in response to the particular modification to the heating of the heating-sensing elements 520, 525. The analysis of the present operation of the thermal mass flow sensor 523 is made relative to a prior operation of the thermal mass flow sensor 523 that occurred in response to the particular modification to the heating to assess whether operation of the thermal mass flow sensor 523 has changed over time.

The prior operation of the thermal mass flow sensor 523 is characterized by the reference data 795, and as discussed further herein, one or more parameter values may be compared by the diagnostic analysis component 792 to determine whether the operation of the mass flow controller 523 changed over time.

Figure 8:
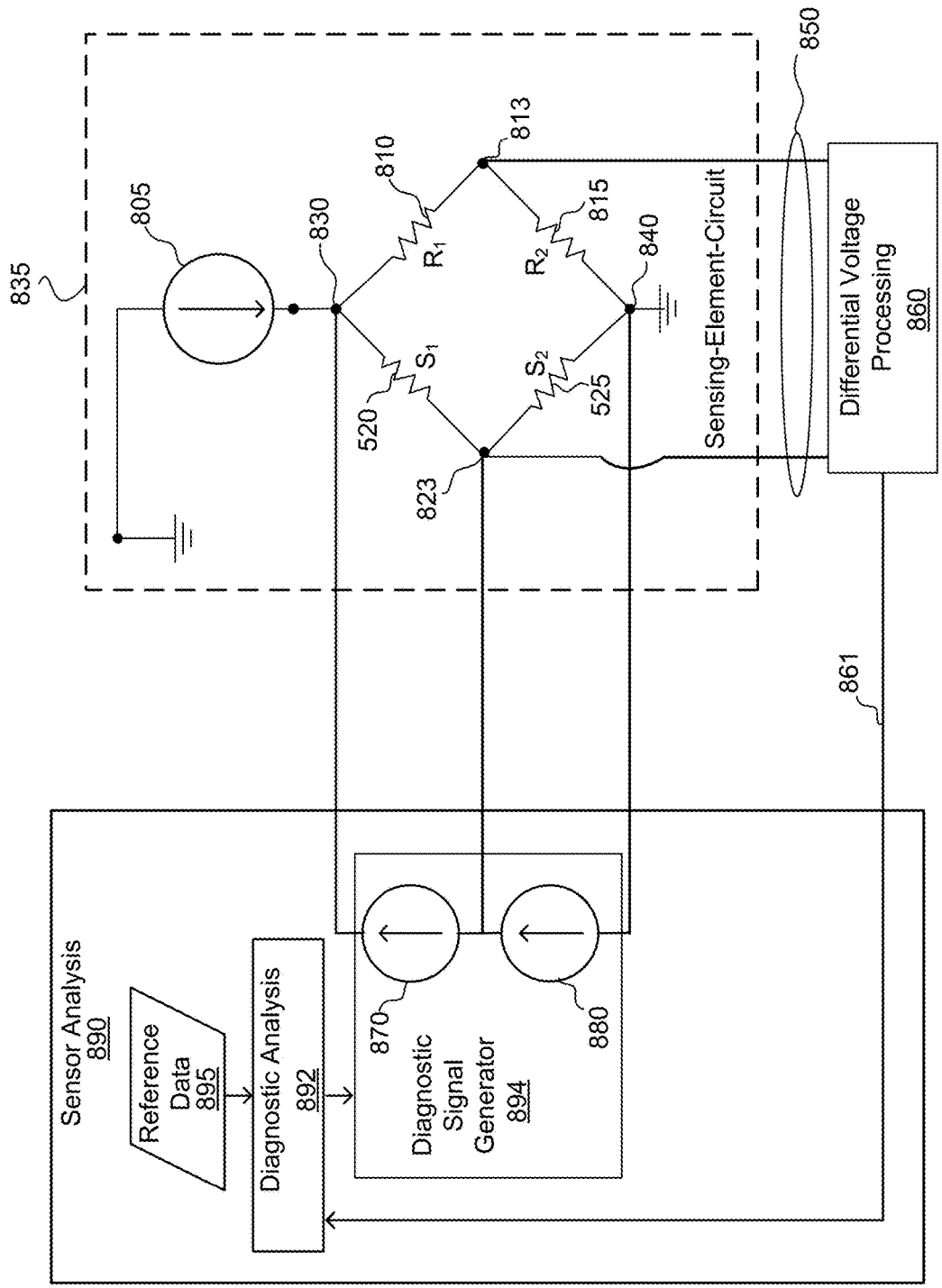
FIG. 8 is a diagram depicting yet another exemplary portion of the mass flow controller described with reference to FIG. 5.

Referring next to FIG. 8, shown is another embodiment of a sensing-element circuit 835. As shown, in this embodiment a sensor-current-source 805 supplies a substantially constant electrical current to a bridge circuit, which includes four nodes (813, 830, 840, and 823) between which elements are connected.

Among those elements are two fixed resistive elements 810, 815 ($R_1$ and $R_2$, respectively). In one illustrative embodiment, fixed resistive elements 810, 815 are both 10k Ohm precision resistors. In addition, heating-sensing elements 520, 525 (shown as resistances $S_1$ and $S_2$, respectively) form a leg of the bridge circuit, and as shown, heating-sensing elements 520, 525 have one node, node 823, in common.

The sensor-current-source 805 in this embodiment supplies heating-sensing elements 520, 525 with a substantially constant electrical current, resulting in the heating of sensor tube 120. The gas flow through the sensor tube 120 produces a temperature differential, which produces a first flow sensor signal 850 that is a differential voltage between the second node 813 and the fourth node 823.

The flow sensor signal 850 varies with the temperature differential between heating-sensing elements 520, 525 in an approximately proportional manner. As depicted, the flow sensor signal 850 may be fed to a corresponding processing component 860 to be processed (e.g., fed to a differential amplifier, digitized, calibrated, and normalized) so that control logic (e.g., the control component 570) may utilize the flow sensor signal 850 to control the control valve 140. Although not depicted for clarity, calibration data may be stored in a memory in the form of a look up table that maps data that is based upon processed representations of the flow sensor signal 850 to flow values for a calibration gas, and during operation, the look up table is accessed to determine actual flow values when a process gas is being controlled.

To arrive at a more accurate measure of the mass flow, the heat capacity (Cp) at constant pressure of the gas is utilized. In many embodiments, the sensing-element circuit 835 is calibrated with one gas (e.g., Nitrogen) and the ratio of the heat capacities of the calibration gas to the operating gas (e.g., Cp(N2)/Cp(gas)), which is referred to a conversion factor (CF), may be derived. The conversion factor (CF) may be derived analytically (e.g., as a ratio of well-known heat capacities) or it may be obtained from live gas testing.

In general, the sensor analysis component 890 utilizes thermal sensor diagnostic techniques to detect whether operation of the thermal mass flow sensor 523 has changed. For example, contamination in the center of the sensor tube 120 and/or close to the heating sensing elements 520, 525 may be detected, and in addition, changes in the sensor insulation and the sensor housing may also be detected.

As shown, the sensor analysis component 890 includes stored reference data 895 that may include response data obtained (e.g., by a manufacturer) before the MFC 500 is provided to the end-user. In general, the reference data 895 characterizes responses of the thermal mass flow sensor 523 to changes in current through one or more of the heating-sensing elements 520, 525 when the thermal mass flow sensor 523 is operating properly (e.g., to provide flow sensor signals within acceptable tolerances). For example the reference data 895 may characterize both a transient and settled response of the first flow sensor signal (also referred to as differential voltage) 850 under nominal conditions to changes in the current provided to the heating-sensing elements 520, 525. For example, the reference data 895 may include data that characterizes a settled output, rise time, delay, undershoot, overshoot, etc. The reference data 895 may also include data that defines transient response curves (under normal conditions), which may be compared to on-tool response curves.

Figure 9:
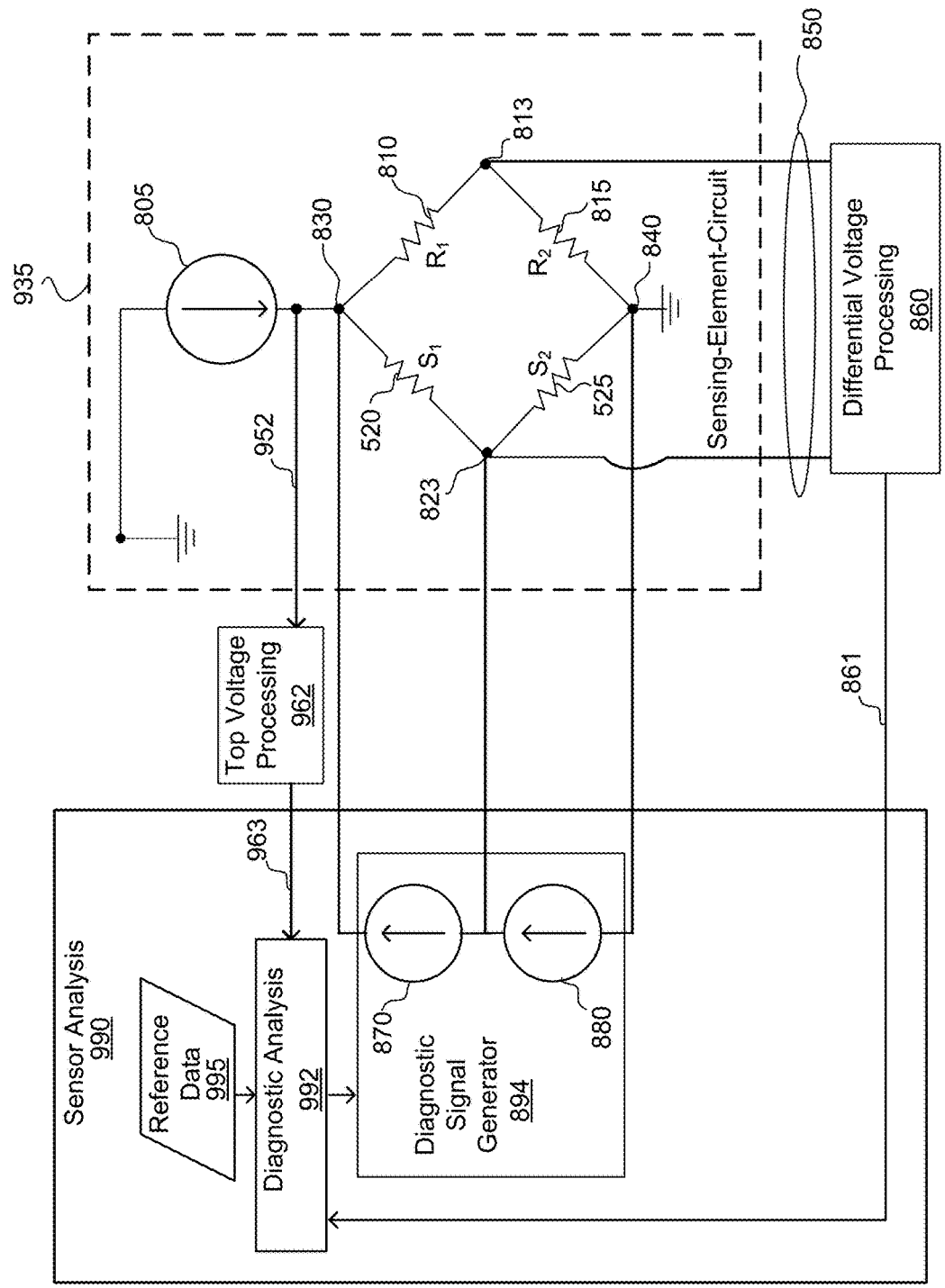
FIG. 9 is a diagram depicting one more exemplary portion of the mass flow controller described with reference to FIG. 5.

Referring next to FIG. 9, a second flow sensor signal 952 is utilized in addition to the flow sensor signal 850 (also referred to as a first flow sensor signal 850) described with reference to FIG. 8. The second flow sensor signal is a voltage (also referred to as a "top" voltage) between a first node 830 and a third node 840, which changes because the average temperature of the heating-sensing elements 520, 525 is decreasing due to gas flow.

As discussed above with reference to FIG. 8, the flow sensor signal 850 varies with the temperature differential between heating-sensing elements 520, 525 in an approximately proportional manner, and in the embodiment depicted in FIG. 9, the second flow sensor signal 952 varies, in a nonlinear manner, based upon average temperature. As depicted, the flow sensor signals 850, 952 may be fed to corresponding processing components 860 and 962 to be processed (e.g., fed to a differential amplifier, digitized, calibrated, and normalized) so that control logic (e.g., the control component 570) may utilize the first and second flow sensor signals 850, 952 to control the control valve 140. Although not depicted for clarity, calibration data may be stored in a memory in the form of a look up table that maps data that is based upon processed representations of the two flow sensor signals 850, 952 to flow values for a calibration gas, and during operation, the look up table is accessed to determine actual flow values when a process gas is being controlled.

As discussed above, to arrive at a more accurate measure of the mass flow, the heat capacity (Cp) at constant pressure of the gas is utilized. In many embodiments, the sensing-element circuit 935 is calibrated with one gas (e.g., Nitrogen) and the ratio of the heat capacities of the calibration gas to the operating gas (e.g., Cp(N2)/Cp(gas)), which is referred to a conversion factor (CF), may be derived. The conversion factor (CF) may be derived analytically (e.g., as a ratio of well-known heat capacities) or it may be obtained from live gas testing.

The sensor analysis component 990 in this embodiment may utilize one or both of the two flow sensor signals 850, 952 that are output from the thermal mass flow sensor 523 to detect contamination inside the sensor tube 120. For example, contamination in the center of the sensor tube 120 and/or close to the heating-sensing elements 520, 525 may be detected, and in addition, changes in the sensor insulation and the sensor housing may also be detected. Tests may be performed with a gas inside the sensor tube 120, or without the gas in the tube (e.g., a vacuum in the sensor tube 120).

As shown, the sensor analysis component 990 includes stored reference data 995 that may include response data obtained (e.g., by a manufacturer) before the MFC 900 is provided to the end-user, or response data may be generated on-tool. In general, the reference data 995 characterizes responses of the thermal mass flow sensor 523 to changes in current through one or more of the heating-sensing elements 520, 525 during a prior operation of the thermal mass flow sensor 523. The reference data 995 may characterize the thermal mass flow sensor 523 when the thermal mass flow sensor 523 was operating properly (e.g., to provide flow sensor signals within acceptable tolerances), but the reference data 995 may alternatively characterize operation of the mass flow sensor during a prior time period to simply establish a baseline. For example the reference data may include data that characterizes a response of the first flow sensor signal (also referred to as differential voltage) 850 and/or second flow sensor signal (also referred to as top voltage) 952 under nominal conditions to changes in the current provided to the heating-sensing elements 520, 525. For example, the response data may include data that characterizes a settled output of the top voltage 952 and the differential voltage, rise time, delay, undershoot, overshoot, etc. The reference data 995 may also include data that defines transient response curves (under normal conditions), which may be compared to on-tool response curves.

Figure 10:
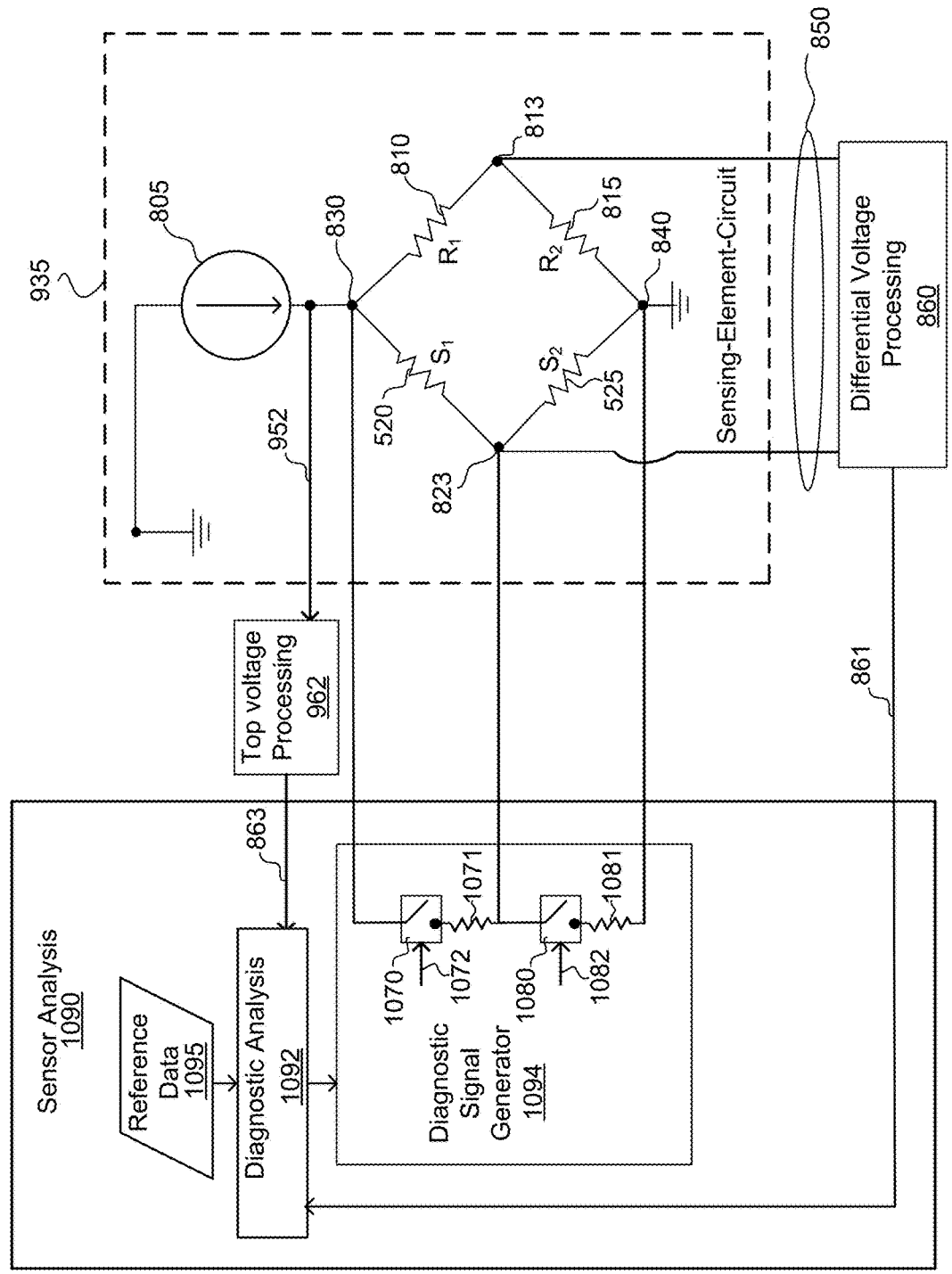
FIG. 10 is a diagram depicting an alternative portion of the mass flow controller described with reference to FIG. 5.

Referring next to FIG. 10, shown is another embodiment in which the sensor analysis component 1090 includes a diagnostic signal generator 1094 that is realized in part by controllable switches 1070, 1080 and resistive elements 1071, 1081. In the particular embodiment depicted in FIG. 10, the sensing-element circuit 935 is the same as the sensing-element circuit 935 described with reference to FIG. 9, but in other embodiments the sensing-element circuits 635, 735, 835 described with reference to FIGS. 6-8 may be utilized in connection with the diagnostic signal generator 1094.

In this embodiment, the heating of the heating-sensing elements 520, 525 is modified by selectively decreasing the current through one or more of the heating-sensing elements 520, 525. Specifically, one or more of the controllable switches 1070, 1080 are closed to draw different levels of current away from the heating-sensing elements 520, 525. In an exemplary implementation, the controllable switches 1070, 1080 are realized by field effect transistors (FETs), and the diagnostic analysis component 1092 controls switch signals 1072, 1082 that are provided to corresponding controllable switches 1070, 1080 to open and close the controllable switches 1070, 1080.

Figure 11:
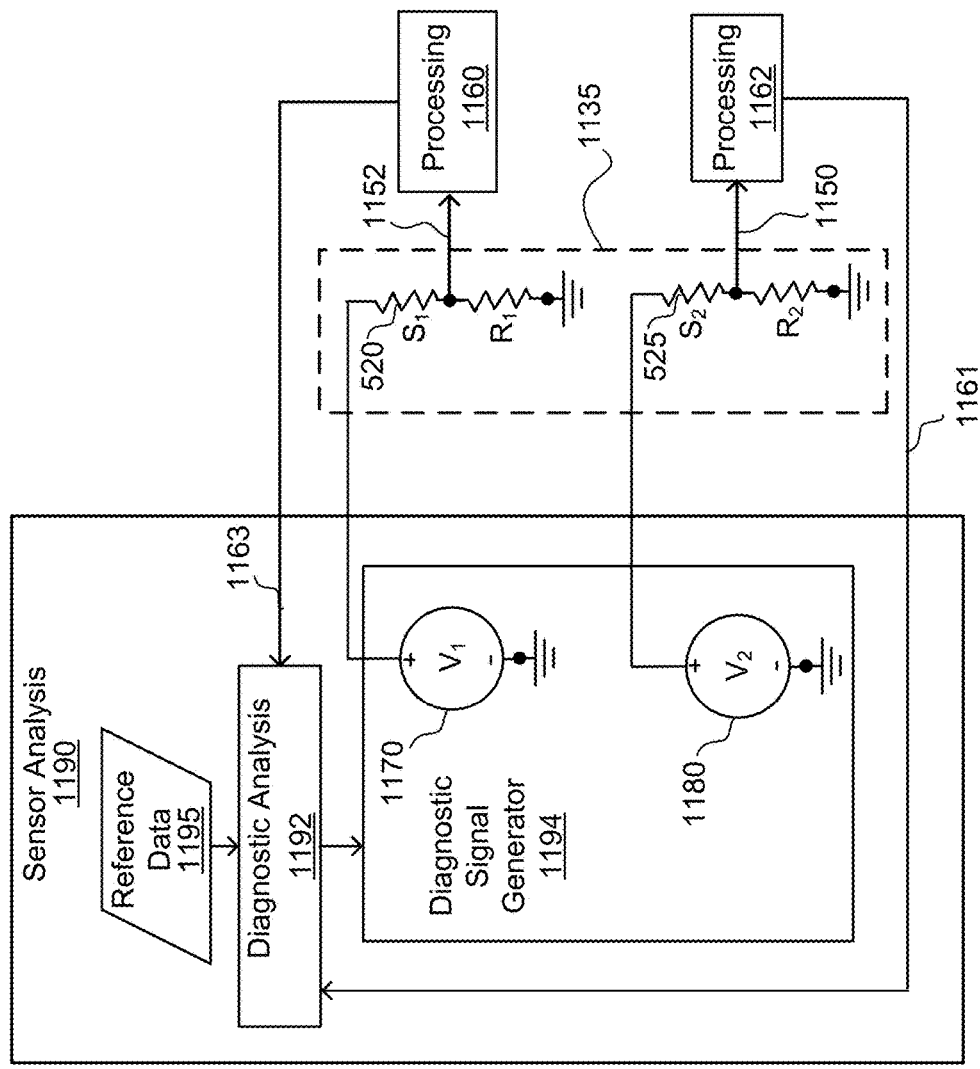
FIG. 11 is a diagram depicting another alternative portion of the mass flow controller described with reference to FIG. 5.

Referring next to FIG. 11, the depicted sensor analysis component 1190 includes a diagnostic signal generator 1194 that is realized in part by controllable voltage sources 1170, 1180 that are each coupled to a corresponding one of the heating-sensing elements 520, 525 of the sensing-element circuit 1135. In operation, the diagnostic analysis component 1192 controls the voltage of the controllable voltage sources 1170, 1180 to effectuate a modification to the heating of the heating-sensing elements 520, 525. When operated in a diagnostic mode of operation, diagnostic analysis component 1192 then analyzes, based upon the measured flow signals 1161, 1163, the present operation of the thermal mass flow sensor 523 in response to the particular modification to the heating of the heating-sensing elements 520, 525. The analysis of the present operation of the thermal mass flow sensor 523 is made relative to a prior operation of the thermal mass flow sensor 523 that occurred in response to the particular modification to the heating to assess whether operation of the thermal mass flow sensor 523 has changed over time.

The prior operation of the thermal mass flow sensor 523 is characterized by the reference data 1195, and as discussed further herein, one or more parameter values may be compared by the diagnostic analysis component 1192 to determine whether the operation of the thermal mass flow sensor 523 changed over time. As discussed, a change in operation of the thermal mass flow sensor 523 over time suggests that the thermal mass flow sensor 523 may no longer be operating as expected; thus further investigation may be initiated when there is a change.

Figure 12:
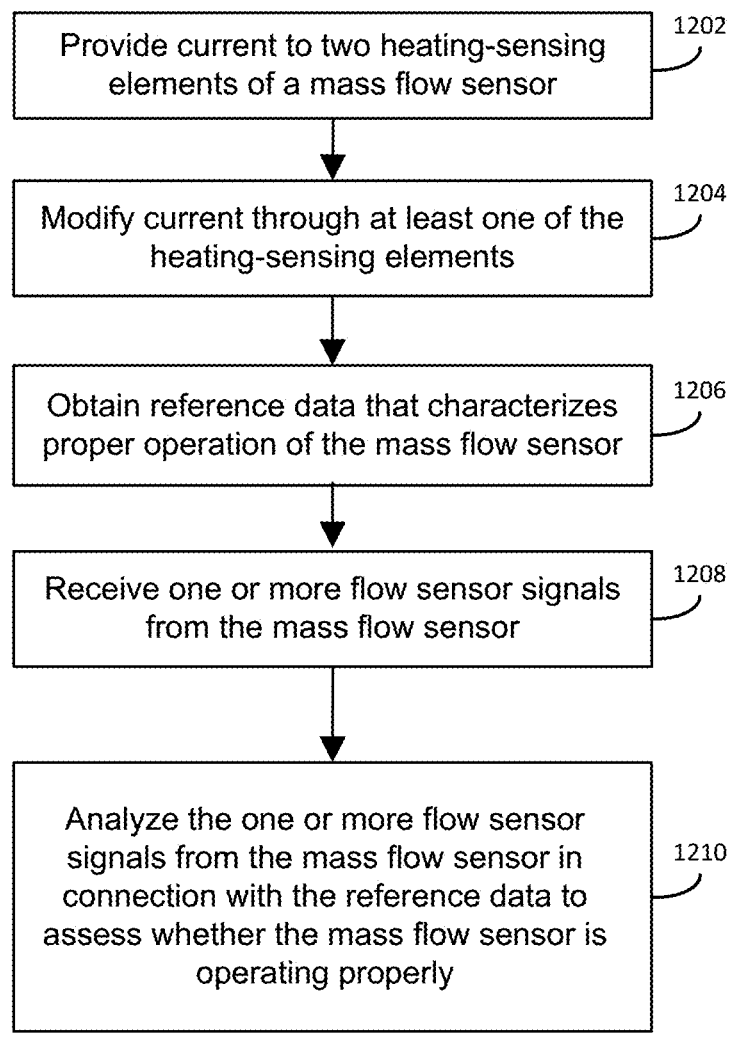
FIG. 12 is a flowchart depicting an exemplary method that may be traversed in connection with the embodiments illustrated in FIGS. 6-11.

Referring next to FIG. 12, it is a flowchart depicting a method for determining whether a mass flow sensor (e.g., the thermal mass flow sensor 523) is operating properly. As shown, current is provided to the two heating-sensing elements 520, 525 (Block 1202)(e.g., by the diagnostic signal generator 694, 794, or the sensor-current-source 805), and the current through at least one of the heating-sensing elements 520, 525 is modified (Block 1204). As depicted in FIGS. 6, 7, 8, and 9, a diagnostic analysis component 692, 792, 892, 992 may control a diagnostic signal generator 694, 794, 894 that includes two controllable current sources 670, 680, 770, 780, 870, 880 which are each capable of providing current to a corresponding one of the heating-sensing elements 520, 525 (e.g., while the MFC 500 is coupled to the tool, but between process runs). As discussed with reference to FIG. 10, the diagnostic analysis component 1092 may control a diagnostic signal generator 1094 that includes two controllable switches 1070, 1080, which are each capable of drawing current away from the heating-sensing elements 520, 525 to modify the current through the heating-sensing elements 520, 525. And as shown in the embodiment depicted in FIG. 11, the diagnostic analysis component 1192 controls the voltage of the controllable voltage sources 1170, 1180 to effectuate a modification to the current through the heating-sensing elements 520, 525.

During one exemplary test, the current through one or both of the heating-sensing elements 520, 525 is modified, and a transient response from the thermal mass flow sensor 523 is monitored. As one of ordinary skill in the art in view of this disclosure will appreciate, the current that is provided to the heating-sensing elements 520, 525 emulates the effects that a change in gas flow has upon the heating-sensing elements 520, 525. More specifically, the modification to the current through one or both of the heating-sensing elements 520, 525 will cause a transient signal from both of the flow sensor signals 550, 552, 650, 652, 750, 752, 850, 952, 1150, 1152. Although the response of the thermal mass flow sensor 523 to modified currents emulates actual operation (when gas flow is controlled during plasma processing), the response data (e.g., in the form of a test curve) is not affected by gas flow dynamics and, importantly, the response data is not affected by pressure perturbations in the gas supply line, which is a major reason for flow deviations in low-flow MFCs.

As shown in FIG. 12, reference data 695, 795, 895, 995, 1095, 1195 is obtained that characterizes proper operation of the thermal mass flow sensor (Block 1206). As discussed above, the stored reference data 695, 795, 895, 995, 1095, 1195 may include response data obtained (e.g., by a manufacturer) before the MFC 500 is provided to the end-user, that characterizes a transient response of one or more flow sensor signals 550, 552, 650, 652, 750, 752, 850, 952, 1150, 1152 (under nominal conditions) to changes in the current provided to the heating-sensing elements 520, 525. For example, the response data may include data that characterizes rise time, delay, undershoot, overshoot, etc. The response data may also include data that defines transient response curves (under normal conditions), which may be compared to on-tool response curves.

As depicted, one or more flow sensor signals 550, 552, 650, 652, 750, 752, 850, 952, 1150, 1152 are received from the thermal mass flow sensor 523 (Block 1208). Although it is contemplated that the flow sensor signals 550, 552, 650, 652, 750, 752, 850, 952, 1150, 1152 may be utilized in connection with Block 1208 and the method depicted in FIG. 12, digital representations of the flow sensor signals 550, 552, 650, 652, 750, 752, 850, 952, 1150, 1152 (referred to herein as measured flow signals 561, 563, 661, 663, 761, 763, 861, 963, 1161, 1163) may be utilized. For example, the diagnostic analysis component 992 depicted in FIG. 9 may measure the response of the thermal mass flow sensor 523 utilizing one or more of the measured flow signals 861, 963 output from the differential voltage processing component 860 and/or the top voltage processing component 962, respectively.

The diagnostic analysis component 692, 792, 892, 992, 1092, 1192 then analyzes the one or more flow sensor signals from the thermal mass flow sensor 523 in connection with the reference data 695, 795, 895, 995, 1095, 1195 to assess whether the thermal mass flow sensor 523 is operating properly (Block 1210). For example, the diagnostic analysis component 992 depicted in FIG. 9 compares the response of the output of the differential voltage processing component 860 and/or the top voltage processing component 962 to the stored reference data 995 to determine whether the thermal mass flow sensor 523 is operating properly.

Figure 13:
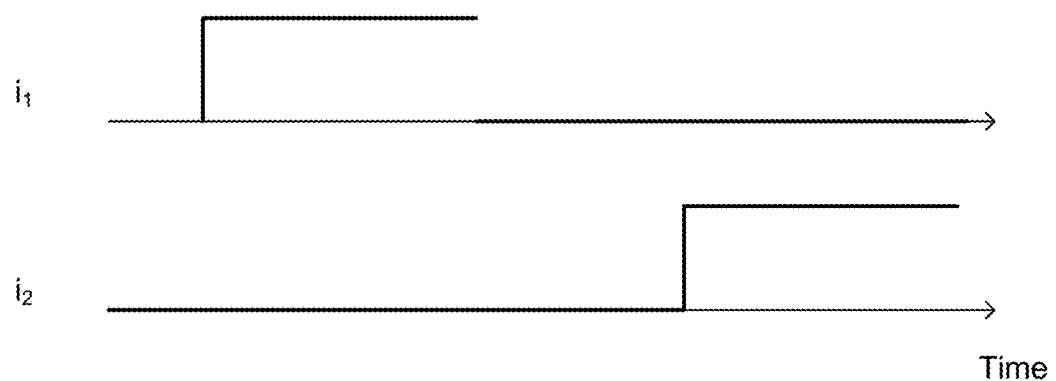
FIGS. 13 and 13A are graphs depicting exemplary currents that may be provided to the heating-sensing elements.

As shown in FIG. 13, in one exemplary test mode, an increase in current ($i_1$) may be provided to one heating-sensing element (e.g., heating-sensing element 520) and a similar increase in current ($i_2$) may be provided to the other heating-sensing element (e.g., heating-sensing element 525) so current is modified in only one heating-sensing element at a time. Each transient curve obtained during each increase in current can be compared with the "reference" curve measured during manufacturing and stored in the reference data 695, 795, 895, 995, 1095, 1195.

Figure 13A:
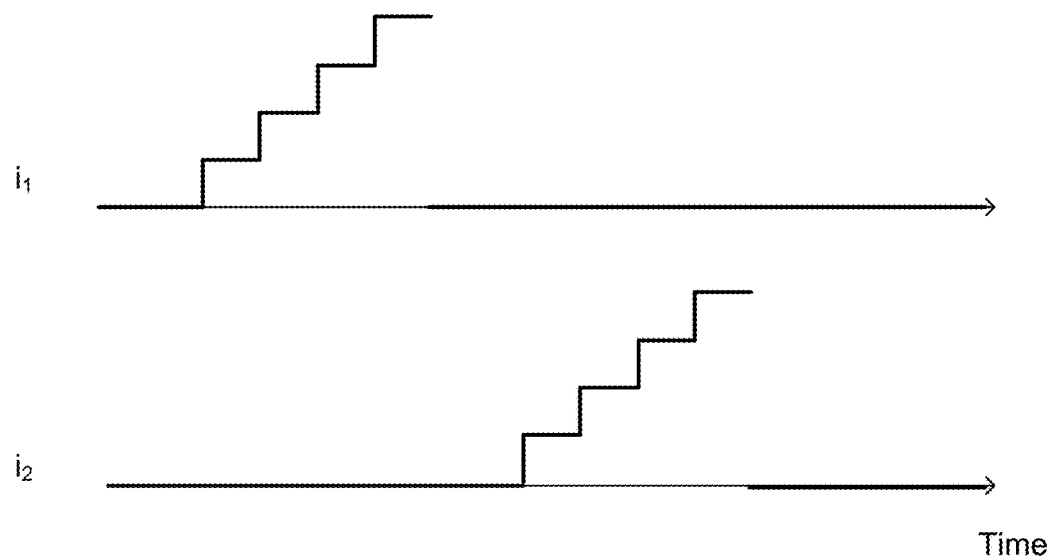

A variation of the depicted application of current in FIG. 13 is shown in FIG. 13A. The application of current depicted in FIG. 13A enables detection of abnormalities of the heat transfer in the thermal sensor due to non-symmetry of the sensor characteristics caused by contamination or insulation. As shown, step-like-current-increases (shown as i1) are first applied to the first heating-sensing element 520, a first transient response curve is obtained, and the level of current is then reset to an initial value through the first heating-sensing element 520. Then similar step-like-current-increases (shown as i2) are applied to the second heating-sensing element 525, a second transient response curve is obtained, and then the first and second transient response curves are compared. Any non-symmetry of the characteristics of the heating-sensing elements 520, 525 will cause a difference in the transient response curves, which indicates that one or both of the heating-sensing elements 520, 525 may not be operating as expected (e.g., one or both of the heating-sensing elements 520, 525 may be deficient in one or more aspects). This test is typically not possible to perform with actual gas because the MFC and the tool normally cannot run reverse gas flow. This particular diagnostic approach does not require a comparison with a manufacturing "reference" curve.

Figure 14:
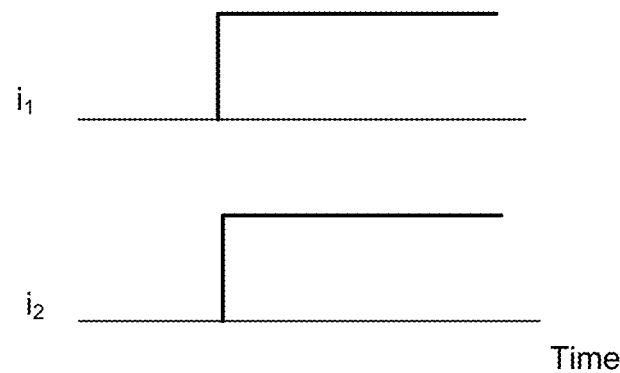
FIG. 14 is a graph depicting additional exemplary currents that may be provided to the heating-sensing elements.
Figure 15:
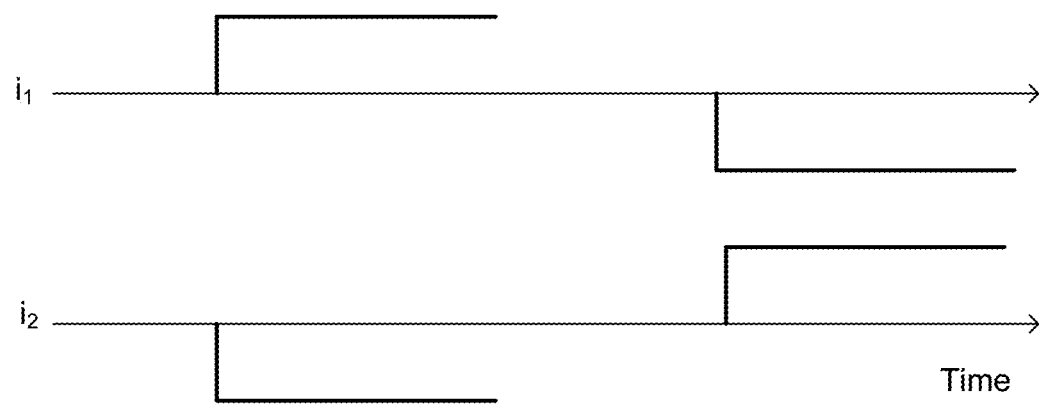
FIG. 15 is a graph depicting yet more exemplary currents that may be provided to the heating-sensing elements.

In another test mode, as depicted in FIG. 14, an increase in current is provided to both heating-sensing elements 520, 525 simultaneously, and in yet another test mode depicted in FIG. 15, current is provided to both heating-sensing elements 520, 525 simultaneously, but current is provided in an opposite direction to one heating-sensing element (to decrease current through that heating-sensing element). In each instance, the diagnostic analysis component 992 depicted in FIG. 9 may compare the signals of one (or both) of the top voltage processing component 962 or the differential voltage processing component 960 to the reference data 995 measured during manufacturing and stored in the MFC memory.

Figure 16:
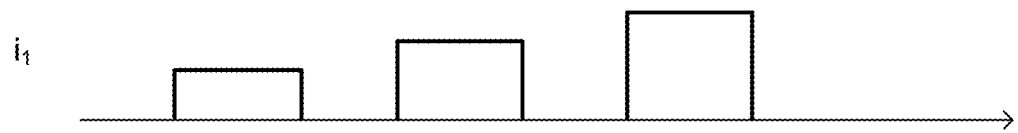
FIG. 16 is a graph depicting step-wise current increases that may be provided to the heating-sensing elements.

Referring to FIG. 16, yet another test mode includes successive step-wise increases to the current provided to one of the heating-sensing elements 520, 525 to analyze the output of the tested heating-sensing element as compared to reference data 695, 795, 895, 995, 1095, 1195 obtained under similar applications of current during nominal conditions. It should be recognized that FIGS. 13-16 depict modifications to the current through one or both of the heating-sensing elements 520, 525 relative to an initial value of current flow that is provided as described with reference to Block 1202 of FIG. 12.

Regardless of what the root cause of the change is (between a test and the reference data), the MFC 500 can indicate to the user that some anomaly is present. In many embodiments, the MFC 500 does not have to indicate what the issue/problem is—it only needs to notify the user that some issue exists.

Figure 17:
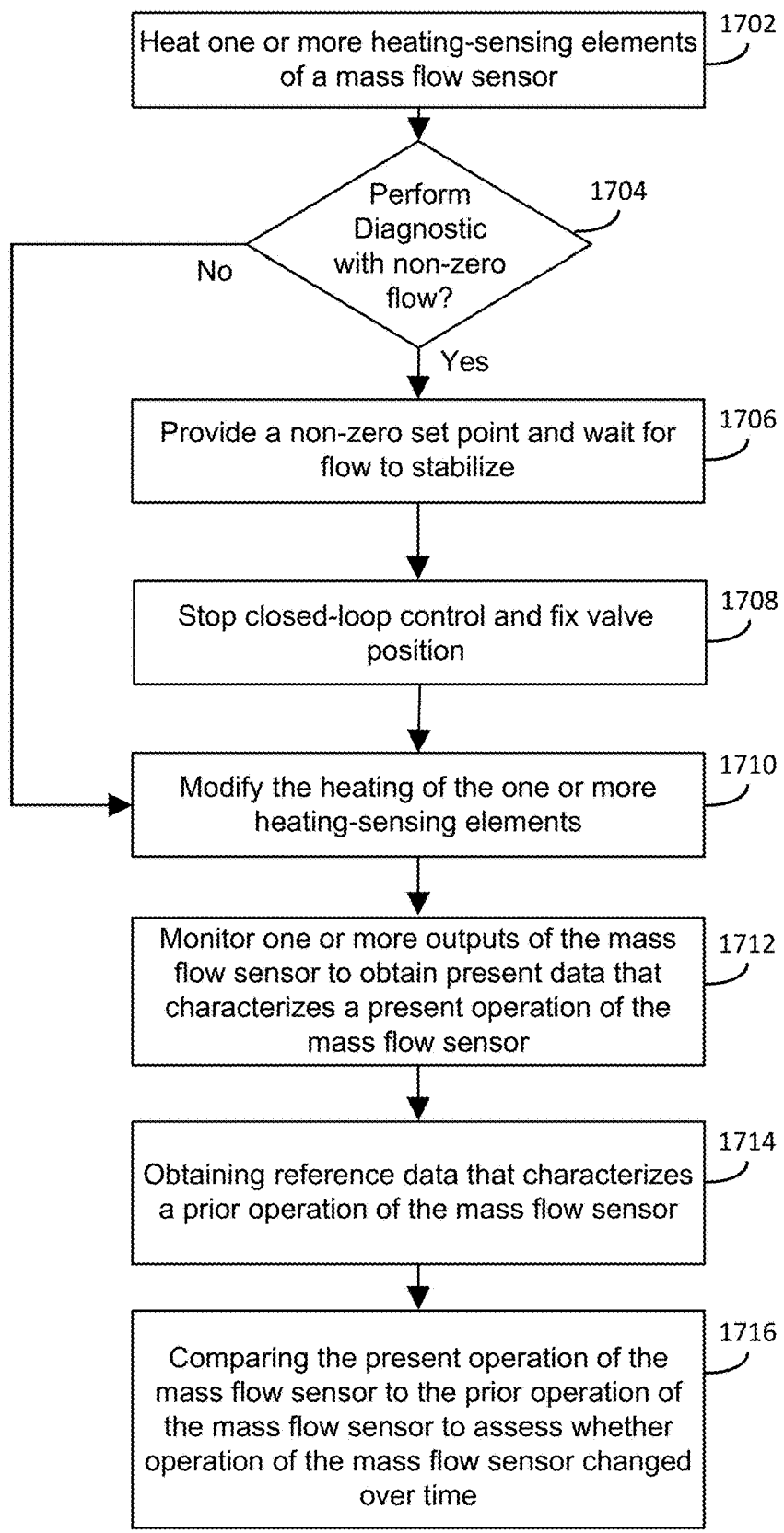
FIG. 17 is a flowchart depicting another exemplary method that may be traversed in connection with the embodiments illustrated in FIGS. 6-11.

Referring next to FIG. 17, it is a flowchart depicting another method for diagnostic analysis that may be traversed in connection with the embodiments disclosed herein. As shown, one or more of the heating-sensing elements 520, 525 of the thermal mass flow sensor 523 are initially heated (Block 1702). For example, the diagnostic signal generators 694, 794 described with reference to FIGS. 6 and 7, respectively, or the sensor-current-source 805 described with reference to FIGS. 8, 9, and 10 may be used to initially heat the heating-sensing elements 520, 525.

If it is desired to perform a diagnostic test with a non-zero level of fluid flow through the thermal mass flow sensor 523 (Block 1704), then a non-zero set point 186 is provided to the control component 570 and the mass flow rate is allowed to stabilize (Block 1706). In addition, the on-tool diagnostic portion 585 stops the closed-loop control of the control component 570 and fixes a position of the control valve 140 by sending an override signal 564 to the control component 570 (Block 1708). If the diagnostic test will not be performed with a non-zero flow (Block 1704), then the steps described with reference to Blocks 1706 and 1708 are not performed. As depicted, regardless of whether diagnostics are performed with zero flow or non-zero flow, the heating of one or more of the heating sensing elements is modified (Block 1710). For example, the diagnostic signal generators 694, 794, 894, 1094, 1194 described above may be utilized to modify the heating of one or more of the heating-sensing elements 520, 525 by effectuating changes to current flowing through one or more of the heating-sensing elements 520, 525.

One or more outputs (e.g., measured flow signals 661, 663, 761, 763, 861, 963) of the thermal mass flow sensor 523 are then monitored to obtain present data that characterizes a present operation of the mass flow sensor in response to the particular modification to the heating of the one or more heating elements (Block 1712). As shown, reference data (e.g., reference data 695, 795, 895, 995, 1095, 1195) is obtained that characterizes a prior operation of the mass flow sensor (Block 1708). In some embodiments, the reference data is stored locally within a housing of the mass flow controller 100 within a reference storage component (e.g., non-volatile memory), but in other embodiments, the reference data is received from a remote storage location. For example, the mass flow controller 100 may be connected to one or more well-known types of networks to receive reference data from remote storage locations.

As shown, the present operation of the thermal mass flow sensor 523 is then compared to the prior operation of the thermal mass flow sensor 523 to assess whether operation of the mass flow sensor has changed over time (Block 1716). As described above, the diagnostic analysis components 692, 792, 892, 992, 1092, 1192 may monitor one or more outputs of the thermal mass flow sensor 523 (Block 1712); obtain the reference data (Block 1714); and compare the present operation of the thermal mass flow sensor 523 to the prior operation of the thermal mass flow sensor 523 to assess whether operation of the mass flow sensor has changed over time (Block 1716).

Referring next to FIG. 18, shown is exemplary reference data 1895 with fields for values associated with parameters including a settled output, delay, rise time, settling time, and overshoot. As discussed above, the parameters depicted in FIG. 18 are exemplary only and additional, different, or fewer parameters may be utilized depending upon a variety of factors including the type of thermal mass flow sensor 523 that is utilized, the range of operation of the mass flow controller 100, and a particular attribute of the thermal mass flow sensor 523 that is under analysis.

It should also be recognized that the collection of reference data 1895 corresponds to only one output (e.g., one of the measured flow signals 661, 663, 761, 763, 861, 963) of the thermal mass flow sensor 523 in response to a change in heating of the heating-sensing elements 520, 525 under a single set point As a consequence, if two outputs of the thermal mass flow sensor 523 are utilized, there may be another set of reference data 1895 for a second output. For example, if the sensing-element circuit 835 (depicted in FIG. 9) is utilized, there may be a first set of reference data 1895 for the first measured flow signal 861 and a second set of reference data 1895 for the second measured flow signal 963.

Similarly there may be multiple sets of reference data 1895 for each output of the thermal mass flow sensor 523 wherein each set of reference data corresponds to a different set point. For example, sets of reference data 1895 corresponding to set points of 0%, 25%, 50%, 75%, and 100% may be stored and utilized. Further, for each output of the thermal mass flow sensor 523, and each set point, there may be multiple sets of reference data 1895 corresponding to different gas types.

Although the parameters may vary, the present data that is obtained at Block 1712 includes at least some of the same parameters in the reference data 1895 so that parameter values obtained from the reference data 1895 may be compared with parameter values obtained from the present data.

Figure 19A:
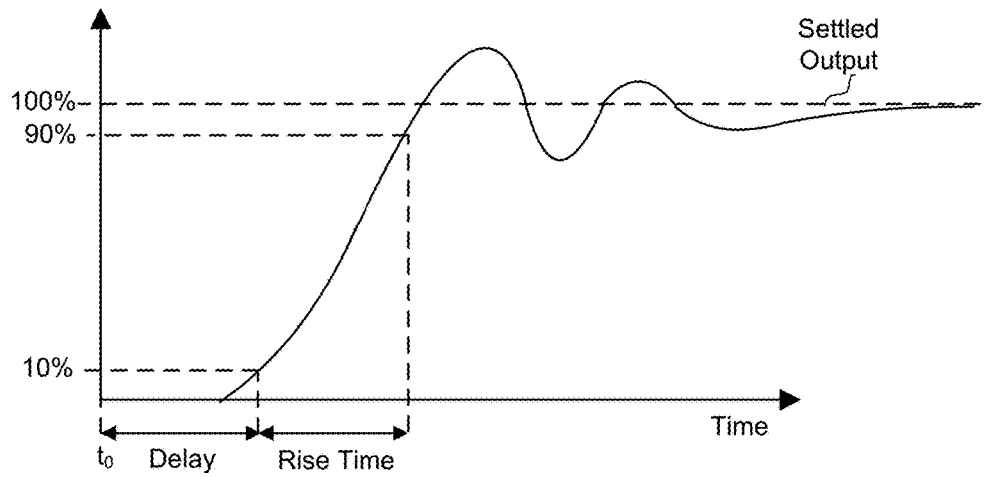
FIG. 19A is a graph depicting an exemplary response to a set point change and exemplary parameters of the response.
Figure 19B:
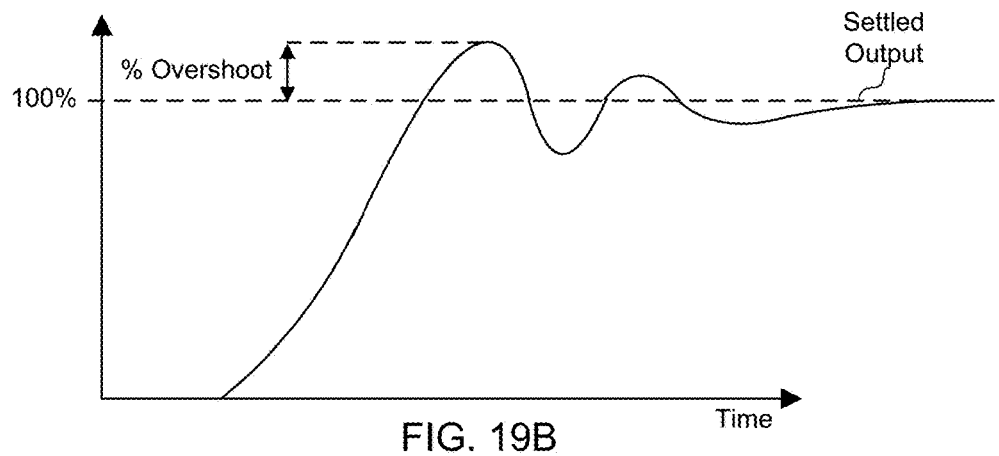
FIG. 19B is a graph depicting another exemplary response to a set point change and other exemplary parameters of the response.
Figure 19C:
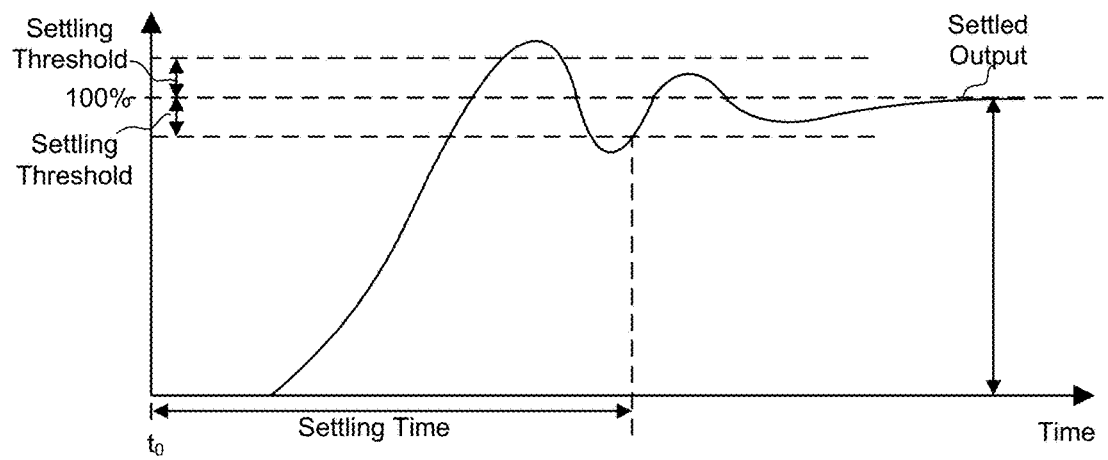
FIG. 19C is a graph depicting yet another exemplary response to a set point change and yet other exemplary parameters of the response.

As depicted, the reference data 1895 may include parameter values for each of a corresponding combination of changes to current that is provided to the heating-sensing elements 520, 525. Referring to FIGS. 19A, 19B, and 19C, shown are graphs depicting an exemplary response of the thermal mass flow sensor 523 to a modification to the heating of one or more of the heating-sensing elements 520, 525 that occurs at a time to. Also depicted in FIGS. 19A, 19B, and 19C are the parameters corresponding to the exemplary response. As shown in FIG. 19A, the delay may be defined as a time it takes (starting from to) the output of the thermal mass flow sensor 523 to reach 10% of a settled output value, and the rise time may be defined by a time it takes the output to change from 10% of the settled output value to 90% of the settled output value. As shown in 19B, overshoot may be defined as a percentage of overshoot (relative to the settled output value) that the output undergoes in response to the heating modification. And as shown in FIG. 19C, settling time may be defined as a time it takes (starting from t0) the output of the thermal mass flow sensor 523 to be within a settling threshold of the settled output value. In addition, the settled output value shown in FIG. 19 is defined as a difference between a starting value (e.g., indicative of a starting voltage) just before $t_0$ when the heating modification is initiated, and a steady state value (e.g., a steady state voltage) after the heating modification.

Figure 20:
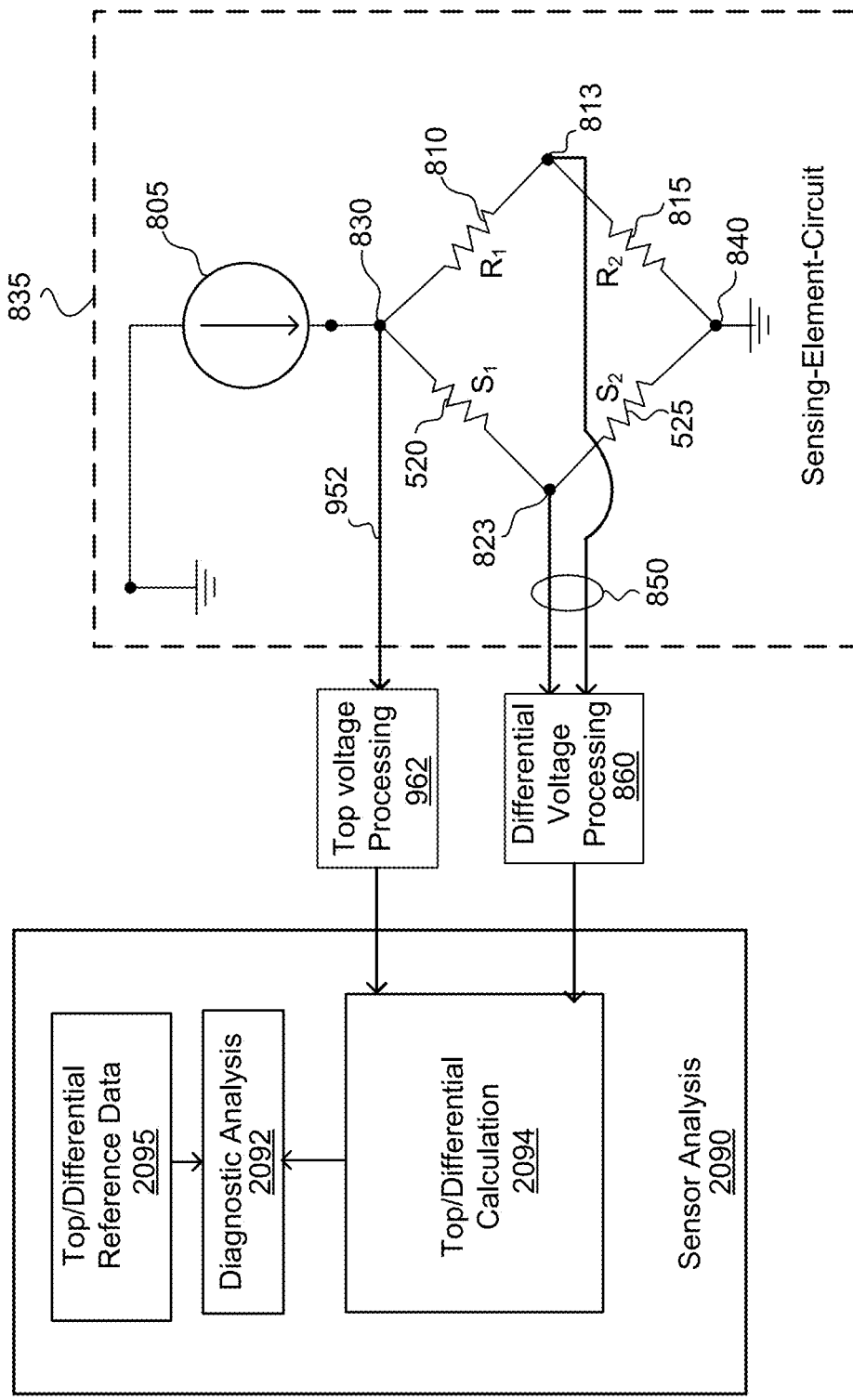
FIG. 20 is a diagram depicting a portion of yet another embodiment of the mass flow controller described with reference to FIG. 1.

Referring next to FIG. 20, shown is another portion of a mass flow controller with a sensor analysis component 2090 that includes a diagnostic analysis component 2092 that is coupled to top/differential voltage reference data 2095 and a top/differential calculation component 2094. In this embodiment, the diagnostic analysis component 2092 verifies accuracy of the MFC on tool, without external flow verifiers and standards. In many implementations, the diagnostic analysis component 2092 does not provide absolute flow verification (i.e., an exact absolute value of the fluid flow), but it does detect if flow measurements are different from those that were obtained during a calibration of the MFC (e.g., by manufacturer before the user receives the MFC) at the same flow, which means that the accuracy of the MFC is questionable.

In this embodiment, sensor sensitivity can be verified by using the first flow sensor signal 850 (also referred to as differential voltage 850) and the second flow sensor signal 952 (also referred to as top voltage 952). During calibration (e.g., by the manufacturer of the MFC) both the differential voltage 850 and top voltage 952 are measured and stored in memory as the top/differential voltage reference data 2095. Additional details of the relationship between the top voltage 952 and differential voltage 850 are found in U.S. patent application Ser. No. 12/575,574, filed Apr. 9, 2010, entitled "MASS FLOW CONTROLLER WITH ENHANCED OPERATING RANGE," which is incorporated herein by reference.

Figure 21:
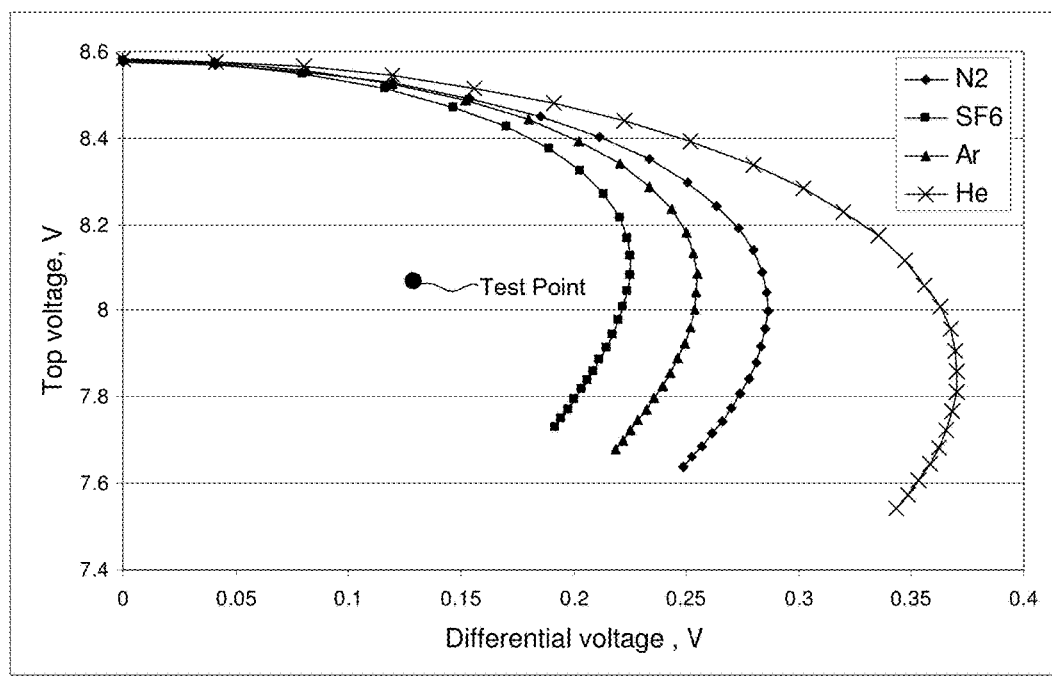
FIG. 21 is a graph depicting exemplary top/differential voltage reference data that may be utilized by the mass flow controller described with reference to FIG. 20.

Referring to FIG. 21, for example, shown is exemplary top/differential voltage reference data 2095 for several types of gases. The top versus differential voltage characteristics depend on sensor geometry, insulation, and thermal conductivity of the gas. For a given gas, the top versus differential voltage combination at any flow during a test should be located at the same curve as that obtained during calibration. During a verification or test cycle (or even during normal MFC operation), the top versus differential voltages are compared with the reference data 2095. If the voltage pair is more than a tolerated deviation off of the curve (as shown by the test point depicted in FIG. 21), the sensor readings are not correct, which could be due to a physical change in the insulator or a contamination of the sensor close to the sensor coils.

Although the top/differential voltage reference data 2095 may include data for different gases, Applicants have discovered that a well-defined relationship exists between a first measurement channel that includes the differential voltage 850 between the second node 813 and the fourth node 823 of the bridge circuit and a second measurement channel that includes the top voltage 952 of the first node 830 (also referred to herein as a top potential) of the bridge circuit. This relationship obviates the need for storing top/differential voltage reference data for several different types of gases. Specifically, Applicants have found that, for any two arbitrary gases (gas 1 and gas 2), the differential voltage 850 and the voltage at the first node 830 of the bridge satisfies the following equations across a wide flow range:

$$D1(f) = D2(SF*f)/SF \qquad \text{eqn (1)}$$

$$T1(f) - T1(0) = (T2(SF*f) - T2(0))/SF \qquad \text{eqn (2)}$$

where f is flow; D1 and D2 are differential voltage functions for gas 1 and gas 2, respectively (e.g., D1 is the voltage differential between nodes 813 and 823 for gas 1 and D2 is the differential voltage 850 between nodes 813 and 823 for gas 2); T1 and T2 are the top voltage functions (potential at the first node 830) for gas 1 and gas 2, respectively; T(0) is the top voltage 952 at the first node 830 at zero flow; and SF is a saturation factor, which is a function of the thermal conductivity of gas 1 and gas 2.

Figure 22:
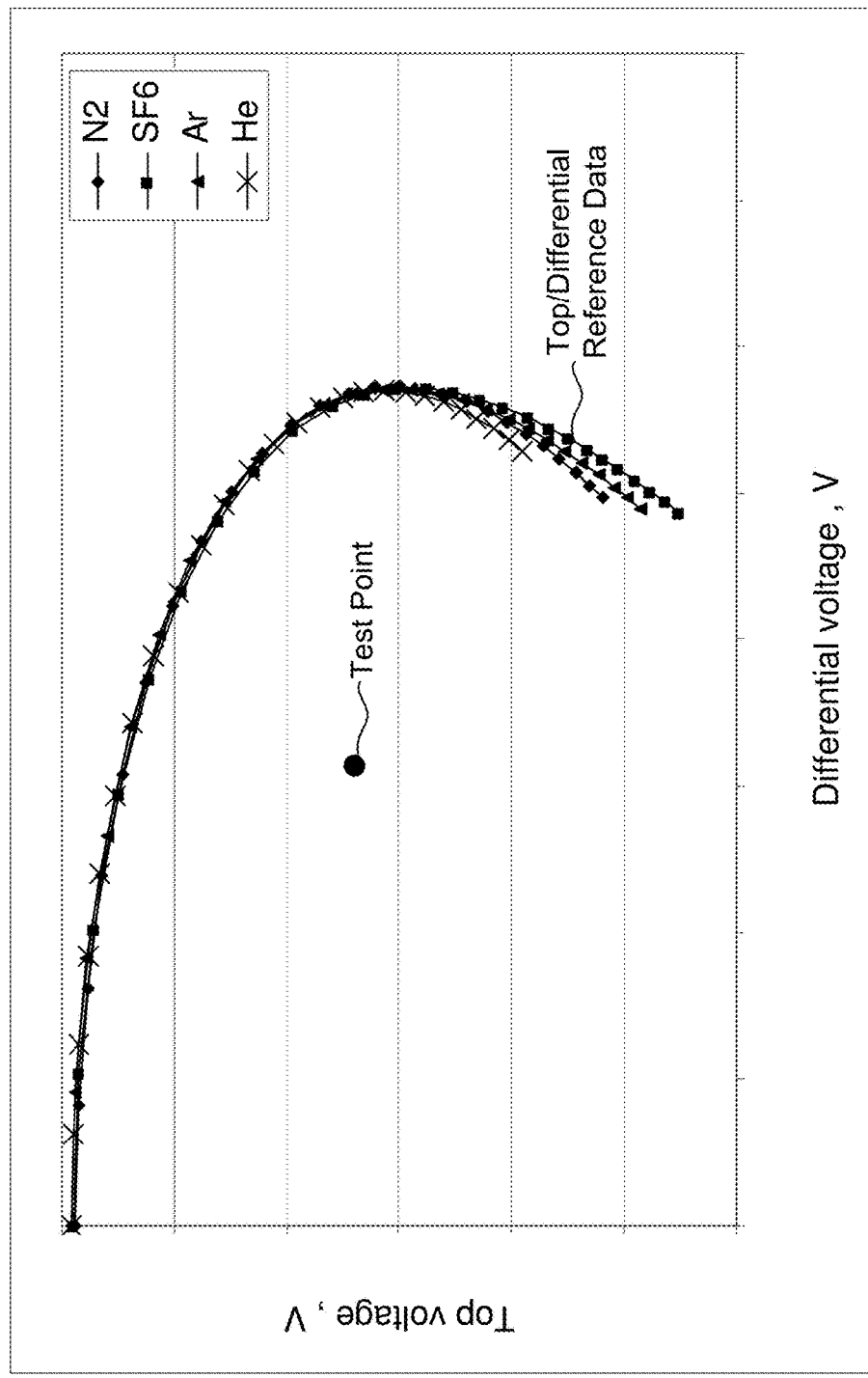
FIG. 22 is a graph depicting a scaled versions of the top/differential voltage reference data in FIG. 21.

Graphically, these equations can be represented by scaling both flow and voltage axes of the graph by a saturation factor SF that is a gas specific factor (i.e., SF is different for each gas). FIG. 22, for example, depicts in accordance with eqn. 1 and eqn. 2, a scaled versions of the graph in FIG. 20, respectively. As shown, when scaled by SF, the data for various process gases can be scaled to match the calibration (e.g., nitrogen) data.

Figure 23:
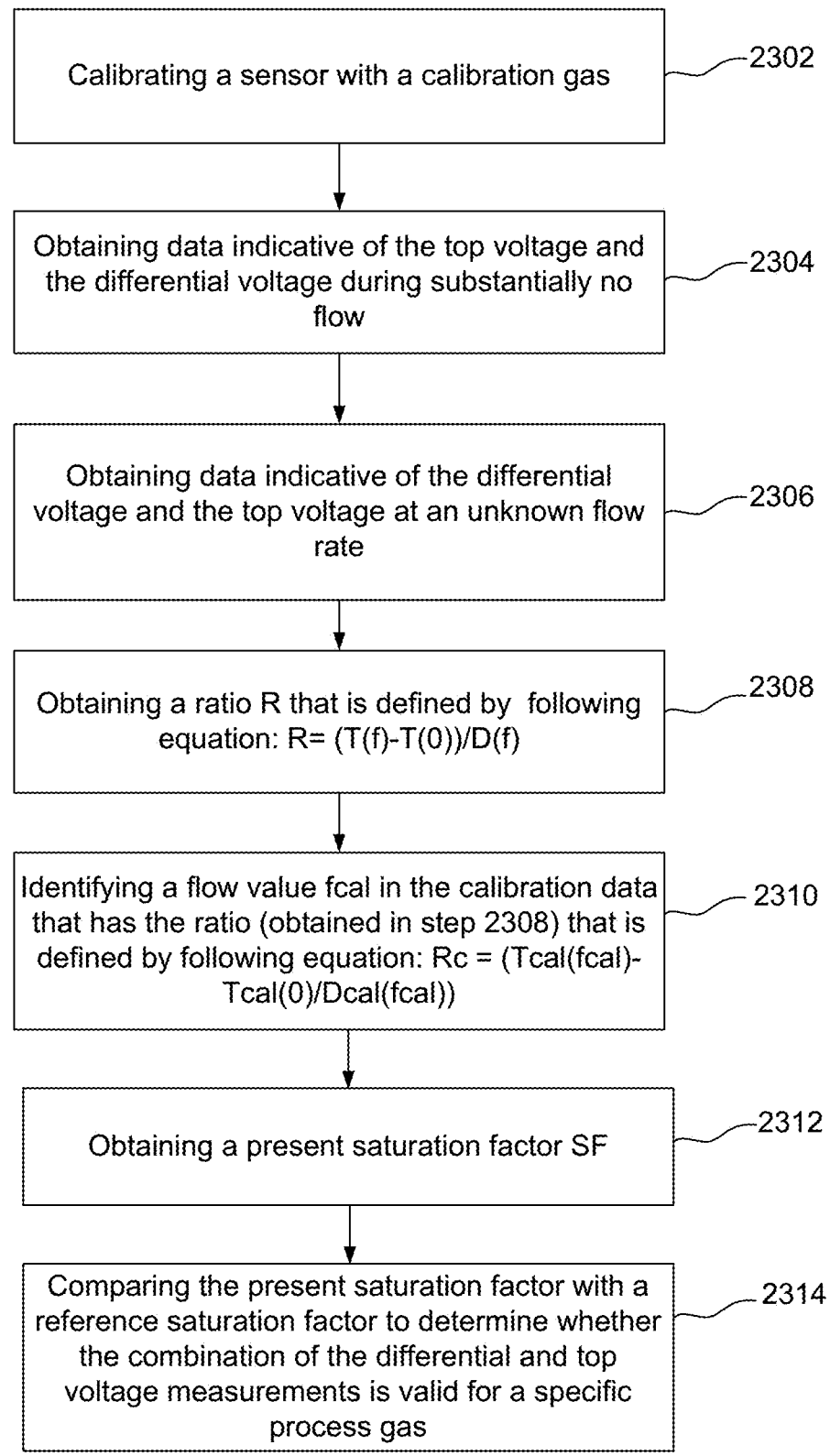
FIG. 23 is a flowchart illustrating a method that may be carried out by the mass flow controller described with reference to FIG. 20.

Referring to FIG. 23, it is a flowchart depicting a method for determining whether the combination of both the differential voltage 850 and top voltage 952 is providing valid data for a specific process gas. As shown, the sensing-element circuit 835 is calibrated (e.g., before the sensor is provided to an end user) with calibration gas (e.g., nitrogen) to obtain the top/differential voltage reference data (Block 2302). In many modes of operation, the top/differential voltage reference data (also referred to herein as calibration data) includes data based upon a differential voltage Dcal (fcal) (e.g., differential voltage 850) and the top voltage Tcal(fcal) at the first node of the bridge (e.g., node 830) as a function of flow fcal. For example, the top/differential voltage reference data 2095 in many implementations includes, for each flow value, data indicative of both, the differential voltage 850 and the top voltage 952. The data can be stored in a memory in the form of a look-up table.

Referring briefly to FIG. 25A for example, the top/differential voltage reference data 2095 may be organized into N data sets, and each data set may include a flow value, a value indicative of the differential voltage 850 at that flow value, and a value indicative of the top voltage 952 at that flow value. It is certainly contemplated that the calibration data may take on different forms while being dependent upon two signals from a bridge circuit; thus it should be recognized that the specific data format in FIG. 25A (and FIG. 25B) may vary without departing from the scope of the present invention.

As depicted, the calibration data may be placed in memory in the form of a look-up table that maps flow values of a calibration gas with calibration data that is based upon values of two flow sensor signals 850 and 952 from a thermal mass flow sensor 523. In addition, each of the N data sets may include a calibration ratio that is based upon the ratio of the top voltage to the differential voltage. As depicted in FIG. 25A, the calibration ratio may be corrected for the zero offset voltage of the top voltage so that, for a particular flow value fcal, the calibration ratio is defined as (Tcal(fcal)−Tcal(0))/Dcal(fcal). Although not depicted in FIG. 25A for simplicity, it is also contemplated that values based upon the differential voltage may be corrected for the zero offset voltage of the differential voltage 850.

Although not required, as depicted in FIG. 25A, an amplitude value may also be calculated (and stored in advance of operation) that is defined as $\sqrt{[(Tcal(fcal)-Tcal(0))^2+Dcal(fcal)^2]}$. In alternative embodiments, the Amplitude value may be calculated once the mass flow controller is in operation, and in these alternative embodiments, the calibration data need not include the Amplitude value.

As depicted in FIG. 23, once the sensor (e.g., sensor 123) is calibrated and in use, at no flow, the top voltage 952 T(0) at the first node 830 and the differential voltage 850 D(0) 850 are measured (e.g., by operator request or automatically in a periodical manner) to obtain zero-offset data (Block 2304). D(0) and T(0) depend upon temperature and both may drift significantly as temperature changes. With respect to D(0), it is preferably equal to zero, but due to temperature it may not be zero, so the actual value may be measured and subtracted from all D values presented below (but for simplicity this subtraction is not shown below). T(0) also drifts with temperature, and as a consequence, it is subtracted from the top voltage T as indicated below. In operation, for an unknown gas flow "f," the differential voltage D(f) 850 and the top voltage 952 at the first node T(f) are measured (Block 2306), and an operational ratio R is calculated based upon the ratio of the top voltage to the differential voltage so that the operational ratio is defined as: $R=(T(f)-T(0))/D(f)$ (Block 2308). Referring briefly to FIG. 25B, for example, memory may store the measured differential voltage D(f) and the top voltage T(f) and a control portion (e.g., including control component 170) may be utilized to obtain an operational ratio R.

As depicted, once the operational ratio R is obtained, the flow fcal in the calibration data that has the same calibration ratio defined by: $R_{cal}=(Tcal(fcal)-Tcal(0))/Dcal(fcal)$ is obtained (e.g., by searching and retrieving calibration data from a look-up table in memory)(Block 2310). In other words, the calibration data is accessed and the flow value fcal is identified that has a corresponding calibration ratio $R_{cal}$ that equals the operational ratio R ($R_{cal}=R$), and then a present saturation factor SF is calculated: $SF=Amplitude/\sqrt{[(T(f)-T(0))^2+D(f)^2]}$ (Block 2312). As shown, the present saturation factor is then compared with a reference saturation factor (RSF) to determine whether the combination of measurements of the differential voltage 850 and top voltage 952 is valid for a specific process gas (Block 2314). Thus, the diagnostics analysis component assess whether the thermal mass flow sensor 523 is providing valid flow-measurements based upon previously generated reference data. The reference saturation factor may be calculated in connection with the calibration process (e.g., calculated by a manufacturer and stored in non-volatile memory in connection with the calibration data). And any significant change of the present SF relative to the RSF over time is a potential indicator of problems with gas configuration or sensor operation. It is also contemplated that the starting RSF is initially generated during actual processing and stored by the user as a starting value.

Figure 24:
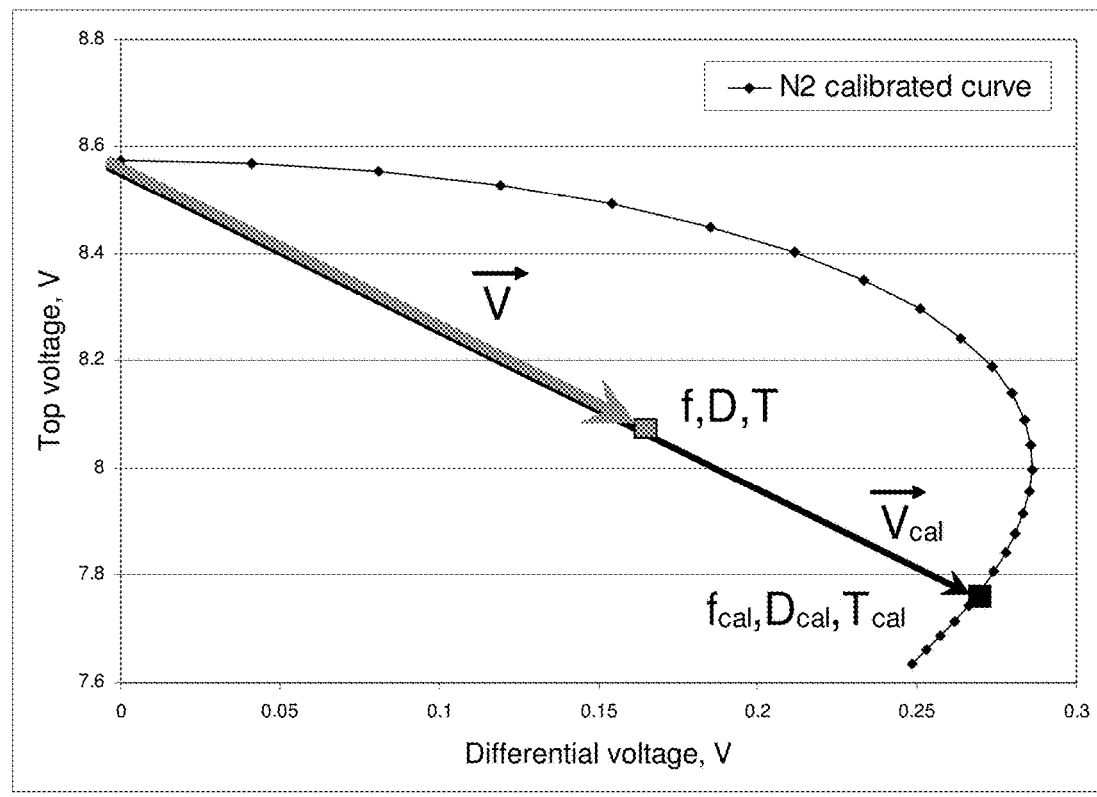
FIG. 24 is a graph that illustrates a graphical representation of the method depicted in FIG. 23.

Referring to FIG. 24, shown is a graphical representation of the method depicted in FIG. 23. As shown, a measured flow "f" with differential voltage 850 (D) and a top voltage 952 (T) at the first node 830 is represented by vector V, with an origin at a zero flow point. The operational ratio $R=(T-T(0))/D$ represents the direction of the vector V. As depicted, a vector Vcal has the same origin and direction, and points to calibration point with a ratio Rc that is the same as the operational ratio R. The ratio of the amplitudes of vector Vcal and vector V is the saturation factor: $SF=abs(Vcal)/abs(V)$. Thus, the structure and methodologies disclosed herein enable the differential and top voltage outputs to be validated for an unknown gas with unknown thermal conductivity over a wide flow range.

Figure 26:
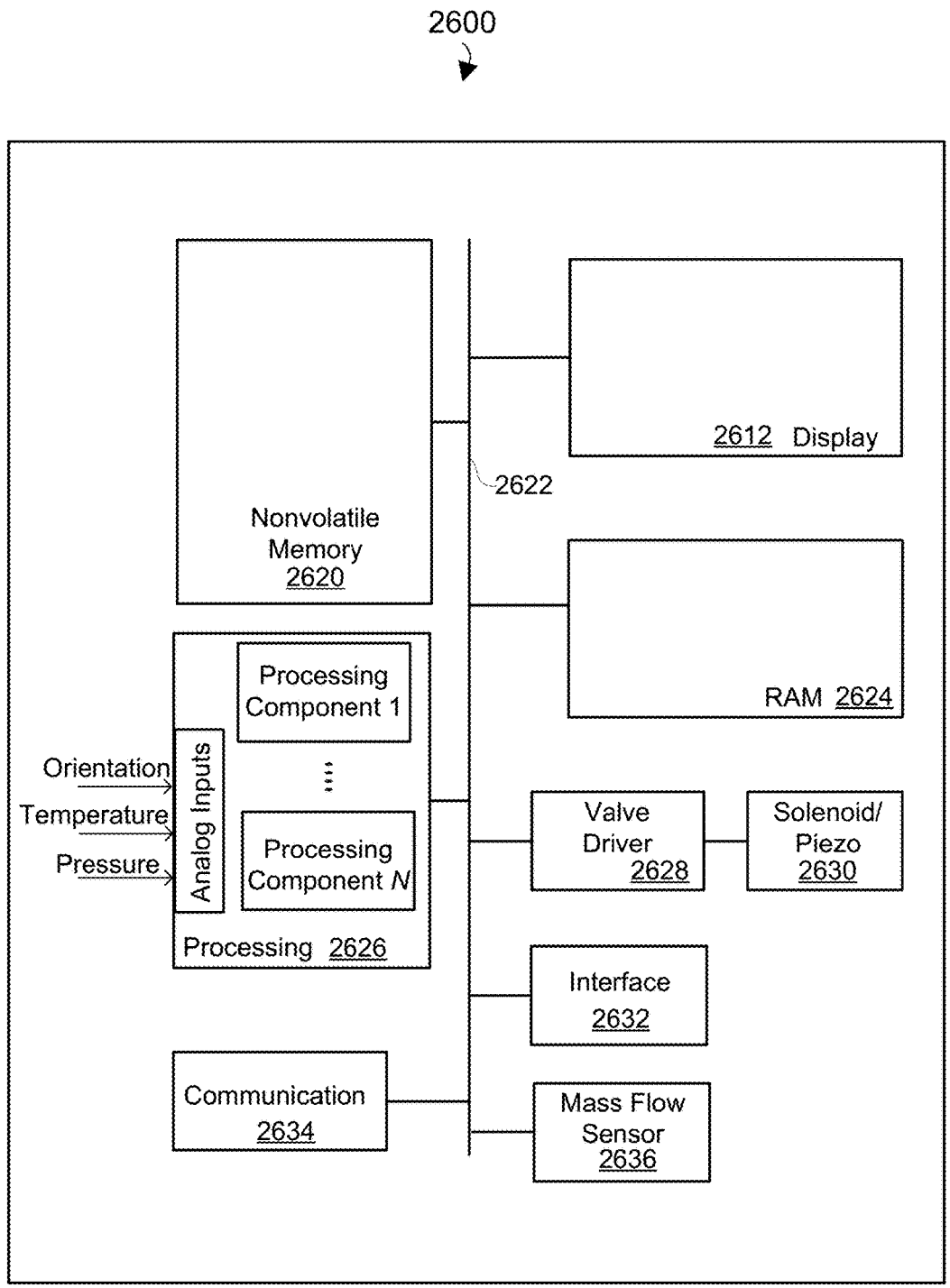
FIG. 26 is a block diagram that depicts physical components that may be utilized to realize the mass flow controllers described herein.

Referring next to FIG. 26, shown is a block diagram 2600 depicting physical components that may be utilized to realize embodiments of the MFCs disclosed herein. As shown, a display portion 2612, and nonvolatile memory 2620 are coupled to a bus 2622 that is also coupled to random access memory ("RAM") 2624, a processing portion (which includes N processing components) 2626, a valve driver component 2628 that is in communication with a solenoid or piezo type valve 2630, an interface component 2632. Although the components depicted in FIG. 26 represent physical components, FIG. 26 is not intended to be a hardware diagram; thus many of the components depicted in FIG. 26 may be realized by common constructs or distributed among additional physical components. Moreover, it is certainly contemplated that other existing and yet-to-be developed physical components and architectures may be utilized to implement the functional components described with reference to FIG. 26.

This display portion 2612 generally operates to provide a presentation of content to a user, and in several implementations, the display is realized by an LCD or OLED display. In general, the nonvolatile memory 2620 functions to store (e.g., persistently store) data and executable code including non-transitory processor-executable code that is associated with the functional components depicted herein (e.g., the diagnostic analysis components). In some embodiments for example, the nonvolatile memory 2620 includes bootloader code, software, operating system code, file system code, and code to facilitate the implementation of one or more portions of the components discussed herein.

In many implementations, the nonvolatile memory 2620 is realized by flash memory (e.g., NAND or ONENAND™ memory), but it is certainly contemplated that other memory types may be utilized as well. Although it may be possible to execute the code from the nonvolatile memory 2620, the non-transitory executable code in the nonvolatile memory 2620 is typically loaded into RAM 2624 and executed by one or more of the N processing components in the processing portion 2626. As shown, the processing component 2626 may receive analog temperature and pressure inputs that are utilized by the functions carried out by diagnostic analysis components.

The N processing components in connection with RAM 2624 generally operate to execute the non-transitory instructions stored in nonvolatile memory 2620 to effectuate the functional components and methodologies described herein. For example, the control component 170 may be realized by one or more of the N processing components in connection with non-transitory processor-readable control instructions that are executed from RAM 2624. In addition, the on-tool diagnostic portion 585 may be realized by one or more of the N processing components in connection with non-transitory processor-readable instructions that are executed from RAM 2624 to carry out the methods described herein. And the memory described herein (e.g., for storing reference data 695) may be realized by the nonvolatile memory 2620.

The interface component 2632 generally represents one or more components that enable a user to interact with the MFC 100. The interface component 2632, for example, may include a keypad, touch screen, and one or more analog or digital controls, and the interface component 2632 may be used to translate an input from a user into the set point signal 155. And the communication component 2634 generally enables the MFC to communicate with external networks and devices including the external processing tools. One of ordinary skill in the art will appreciate that the communication component 2634 may include components (e.g., that are integrated or distributed) to enable a variety of wireless (e.g., WiFi) and wired (e.g., Ethernet) communications.

The mass flow sensor 2636 depicted in FIG. 26 depicts a collection of components known to those of ordinary skill in the art to realize the thermal mass flow sensor 123. These components may include sensing elements, amplifiers, analog-to-digital conversion components, and filters.

Those of skill in the art will appreciate that the information and signals discussed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will also appreciate that the various illustrative logical blocks, modules, circuits, and algorithm steps described in connection with the embodiments disclosed herein may be implemented by other alternative components than those depicted in FIG. 26. To clearly illustrate this interchangeability of hardware and software, various illustrative components, blocks, modules, circuits, and steps have been described above generally in terms of their functionality. Whether such functionality is implemented as hardware, firmware or software in connection with hardware depends upon the particular application and design constraints imposed on the overall system. Skilled artisans may implement the described functionality in varying ways for each particular application, but such implementation decisions should not be interpreted as causing a departure from the scope of the present invention.

More specifically, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor (e.g., as shown in FIG. 26), or in a combination of the two. A software module may reside in non-transitory processor readable mediums such as RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mass flow controller comprising:
   a main flow path for a fluid;
   a control component and a control valve, wherein the control component and the control valve are configured to collectively control a flow rate of the fluid;
   a sensing element circuit coupled to the control component, the sensing element circuit including a bridge circuit including a first, second, third, and fourth nodes, a first resistive component being connected between the first and second nodes, a second resistive component being connected between the second and third nodes, a first sensing element being connected between the first and fourth nodes, and a second sensing element being connected between the fourth and third nodes;

a differential voltage processing component portion to provide a first output that is indicative of a differential voltage between the second and fourth nodes;

a top voltage processing component to provide a second output indicative of a top voltage between the first node and the third node;

top-and-differential voltage reference data stored in non-volatile memory that defines a characteristic curve by relating each of a plurality of top voltage reference values to a corresponding one of a plurality of differential voltage reference values; and a sensor analysis component configured to:
obtain a top and differential voltage pair during operation; and
assess whether the top and differential voltage pair deviate from the characteristic curve to determine whether the sensing element circuit has changed since the top-and-differential voltage reference data was stored in the non-volatile memory.

2. The mass flow controller of claim 1, wherein the characteristic curve relates each of a plurality of top voltage reference values to a corresponding one of a plurality of differential voltage reference values for a calibration gas, and wherein the sensor analysis component is configured to:
obtain a plurality of top-and-differential voltage pairs during operation for a process gas;
scale the plurality of top-and-differential voltage pairs by a saturation factor to obtain a scaled curve; and
assess whether the scaled curve deviates from the characteristic curve for the calibration gas to determine whether the sensing element circuit has changed since the top-and-differential voltage reference data was stored in non-volatile memory.

3. The mass flow controller of claim 2, wherein the top-and-differential voltage reference data defines a plurality of characteristic curves for each of a plurality of gases, and wherein each of the plurality of characteristic curves relates each of a plurality of top voltage reference values to a corresponding one of a plurality of differential voltage reference values.

4. A mass flow controller comprising:
a main flow path for a fluid;
a control component and a control valve, wherein the control component and the control valve are configured to collectively control a flow rate of the fluid;
a sensing element circuit coupled to the control component, the sensing element circuit including a bridge circuit including a first, second, third, and fourth nodes, a first resistive component being connected between the first and second nodes, a second resistive component being connected between the second and third nodes, a first sensing element being connected between the first and fourth nodes, and a second sensing element being connected between the fourth and third nodes;
a differential voltage processing component to provide a first output that is indicative of a differential voltage between the second and fourth nodes;
a top voltage processing component to provide a second output indicative of a top voltage between the first node and the third node;
top-and-differential voltage reference data stored in non-volatile memory that defines a characteristic curve by relating each of a plurality of top voltage reference values to a corresponding one of a plurality of differential voltage reference values for a calibration gas;

a sensor analysis component configured to:
obtain, during substantially no flow through the mass flow controller, the top voltage $T(0)$ from the top voltage processing component;
obtain a measured differential voltage $D(f)$ and a measured top voltage $T(f)$ from the differential voltage processing component and the top voltage processing component, respectively, for a process gas at a non-zero flow rate;
obtain an operational ratio, R, wherein $R=(T(f)-T(0))/D(f)$;
identifying, in the top-and-differential voltage reference data, a flow value, fcal, that has a same calibration ratio, Rcal, as the operational ratio, wherein $R_{cal}=(Tcal(fcal)-Tcal(0))/Dcal(fcal)$;
calculating a present saturation factor, SF, where $SF=Amplitude/sqrt[(T(f)-T(0))^2+D(f)^2]$, wherein Amplitude is equal to $sqrt[(Tcal(fcal)-Tcal(0))^2+Dcal(fcal)^2]$; and
comparing the present saturation factor, SF, with a reference saturation factor (RSF) to determine whether the differential voltage and top voltage is a valid voltage combination for the process gas.

5. A mass flow controller comprising:
a main flow path for a fluid;
a control component and a control valve, wherein the control component and the control valve are configured to collectively control a flow rate of the fluid;
a sensing element circuit coupled to the control component, the sensing element circuit including a bridge circuit including a first, second, third, and fourth nodes, a first resistive component being connected between the first and second nodes, a second resistive component being connected between the second and third nodes, a first sensing element being connected between the first and fourth nodes, and a second sensing element being connected between the fourth and third nodes;
a differential voltage processing component to provide a first output that is indicative of a differential voltage between the second and fourth nodes;
a top voltage processing component to provide a second output indicative of a top voltage between the first node and the third node;
top-and-differential voltage reference data stored in non-volatile memory that defines a characteristic curve by relating each of a plurality of top voltage reference values to a corresponding one of a plurality of differential voltage reference values; and
sensor analysis means including:
means for obtaining a top and differential voltage pair during operation; and
means for assessing whether the top and differential voltage pair deviate from the characteristic curve to determine whether the sensing element circuit has changed since the top-and-differential voltage reference data was stored in the non-volatile memory.

6. The mass flow controller of claim 5, wherein the characteristic curve relates each of a plurality of top voltage reference values to a corresponding one of a plurality of differential voltage reference values for a calibration gas, and wherein the sensor analysis means includes:
means for obtaining a plurality of top-and-differential voltage pairs during operation for a process gas;

means for scaling the plurality of top-and-differential voltage pairs by a saturation factor to obtain a scaled curve; and means for assessing whether the scaled curve deviates from the characteristic curve for the calibration gas to determine whether the sensing element circuit has changed since the top-and-differential voltage reference data was stored in non-volatile memory.

7. The mass flow controller of claim 6, wherein the top-and-differential voltage reference data defines a plurality of characteristic curves for each of a plurality of gases, and wherein each of the plurality of characteristic curves relates each of a plurality of top voltage reference values to a corresponding one of a plurality of differential voltage reference values.

* * * * *